US009776814B2

(12) United States Patent
Douglas

(10) Patent No.: US 9,776,814 B2
(45) Date of Patent: Oct. 3, 2017

(54) REMOVING STORED MATERIAL USING A SWEEP HAVING BUMPERS

(71) Applicant: Phillip Douglas, Fredericktown, OH (US)

(72) Inventor: Phillip Douglas, Fredericktown, OH (US)

( * ) Notice: Subject to any disclaimer, the term of this patent is extended or adjusted under 35 U.S.C. 154(b) by 0 days.

(21) Appl. No.: 15/731,231

(22) Filed: May 6, 2017

(65) Prior Publication Data

US 2017/0247206 A1    Aug. 31, 2017

Related U.S. Application Data

(60) Division of application No. 14/545,885, filed on Jul. 1, 2015, now Pat. No. 9,643,800, which is a continuation-in-part of application No. 13/999,396, filed on Feb. 21, 2014.

(60) Provisional application No. 61/850,770, filed on Feb. 23, 2013.

(51) Int. Cl.
*B65G 65/22* (2006.01)
*B65G 65/46* (2006.01)

(52) U.S. Cl.
CPC ...... *B65G 65/466* (2013.01); *B65G 2201/042* (2013.01)

(58) Field of Classification Search
CPC ....... B65G 65/10; B65G 65/22; B65G 65/466
USPC ......... 414/310, 319, 320, 326, 808; 198/518
See application file for complete search history.

(56) References Cited

U.S. PATENT DOCUMENTS

| 521,619 | A | 6/1894 | Jordan |
| 956,393 | A | 4/1910 | Mechling |
| 1,671,706 | A | 5/1928 | Evans |
| 2,395,410 | A | 2/1946 | Kaesler |
| 2,942,820 | A | 6/1960 | Sherburne |
| 3,206,905 | A | 9/1965 | Wavering et al. |
| 3,257,010 | A | 6/1966 | Fickle et al. |
| 3,306,261 | A | 2/1967 | Purdy |

(Continued)

FOREIGN PATENT DOCUMENTS

FR    1108436    1/1956

OTHER PUBLICATIONS

Brock® brochure No. BR-2201/201404, Brock Grain Systems, Milford, Indiana, pp. 1-8 esp. 7; 2014.

(Continued)

*Primary Examiner* — Joseph Dillon, Jr.
(74) *Attorney, Agent, or Firm* — Andrew C. Pike

(57) ABSTRACT

Material is removed from a storage silo that has a conveyor outlet, a system for supporting the outlet within the silo comprising removable legs mounted in deployed positions, and a sweep comprising bumpers. The material is extracted until one leg is accessible out of the material, which is then removed from the deployed position thereof. The sweep is then operated to continue extracting more material until one bumper thereof bumps into another of the deployed legs. The sweep is then stopped, and that other leg is also removed from the deployed position thereof. This sequence of operating and stopping the sweep, and removing each deployed leg, is continued for each of the deployed legs until all of the legs are removed from the deployed positions. Each removed leg may be placed onto the supporting system in a stored position thereof. The sweep is then operated to continue extracting more material.

8 Claims, 8 Drawing Sheets

(56) References Cited

U.S. PATENT DOCUMENTS

| | | | | |
|---|---|---|---|---|
| 3,319,809 | A | * | 5/1967 | Prentice .............. A01F 25/2009 406/57 |
| 3,368,703 | A | * | 2/1968 | Lusk ................... A01F 25/2009 198/625 |
| 3,370,721 | A | * | 2/1968 | Seymour ............. A01F 25/2009 198/519 |
| 3,547,283 | A | * | 12/1970 | Beebe ................. A01F 25/2009 414/320 |
| 3,596,783 | A | * | 8/1971 | De Bower ............ B65G 69/00 414/315 |
| 3,675,796 | A | | 7/1972 | Atkinson et al. |
| 4,057,151 | A | * | 11/1977 | Weaver ............... A01F 25/2018 414/311 |
| 4,117,547 | A | | 9/1978 | Mathis et al. |
| 4,240,772 | A | | 12/1980 | Wyatt |
| 4,313,706 | A | * | 2/1982 | Danford ................ B65D 88/66 222/233 |
| 4,772,173 | A | * | 9/1988 | Buschbom .......... A01F 25/2009 414/310 |
| 5,203,802 | A | * | 4/1993 | Denis .................. B65G 65/466 414/317 |
| 5,967,729 | A | * | 10/1999 | Foes ................... B65G 65/365 414/297 |
| 6,227,357 | B1 | | 5/2001 | Brown, Sr. |
| 6,890,129 | B2 | * | 5/2005 | Fabbri ................... B01D 29/01 406/106 |
| 7,101,140 | B2 | * | 9/2006 | Jonkka ..................... B65G 3/02 198/519 |
| 8,177,053 | B2 | * | 5/2012 | Hood .................... B65G 15/60 198/508 |
| 2005/0254922 | A1 | * | 11/2005 | Berreau ............... B65G 65/466 414/310 |
| 2006/0018739 | A1 | * | 1/2006 | Lambert ................ A01F 25/18 414/326 |
| 2014/0124339 | A1 | | 5/2014 | Murphy et al. |
| 2016/0200528 | A1 | * | 7/2016 | Klubertanz ............ B65G 33/34 414/312 |
| 2016/0304298 | A9 | * | 10/2016 | Hoogestraat ......... B65G 65/466 |
| 2017/0152110 | A1 | * | 6/2017 | Rauser ................ B65D 88/546 |

OTHER PUBLICATIONS

Brock® brochure No. BR-2279/201601, Brock Grain Systems, Milford, Indiana, 1 sheet, 4 pages; 2016.

Brock® brochure No. BR-2120/0210, Brock Grain Systems, Milford, Indiana, 1 sheet, 6 pages; no date.

Push-Pac® Systems brochure, Christianson Systems, Inc., Blomkest, Minnesota, 1 sheet, 2 pages; 2014.

* cited by examiner

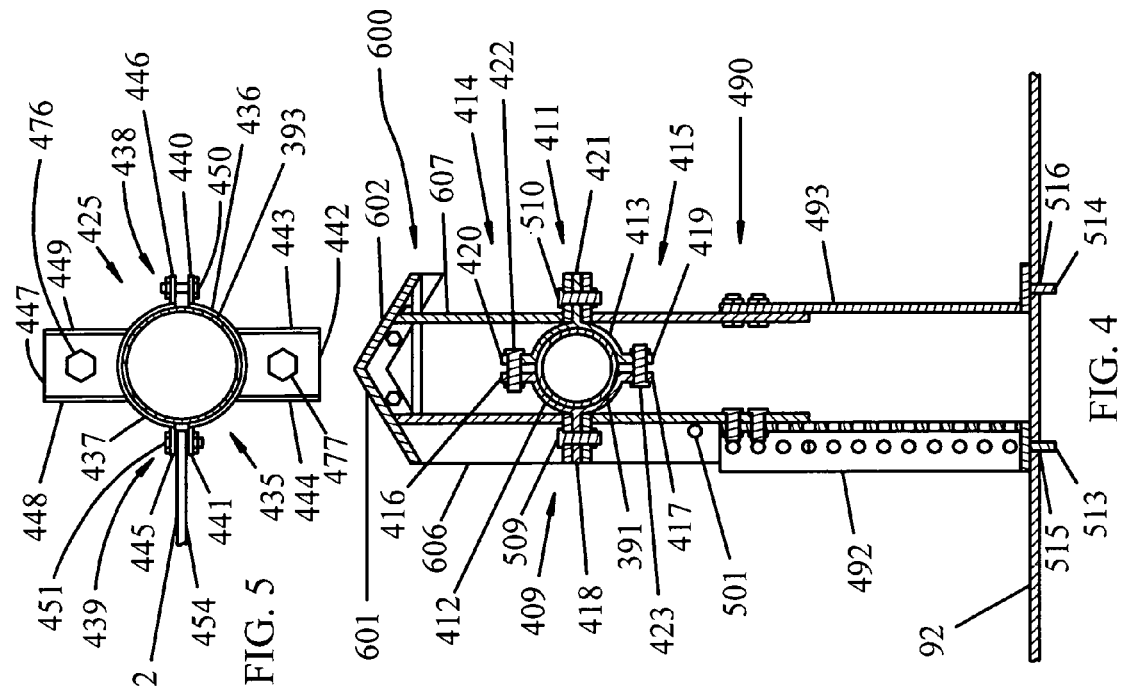
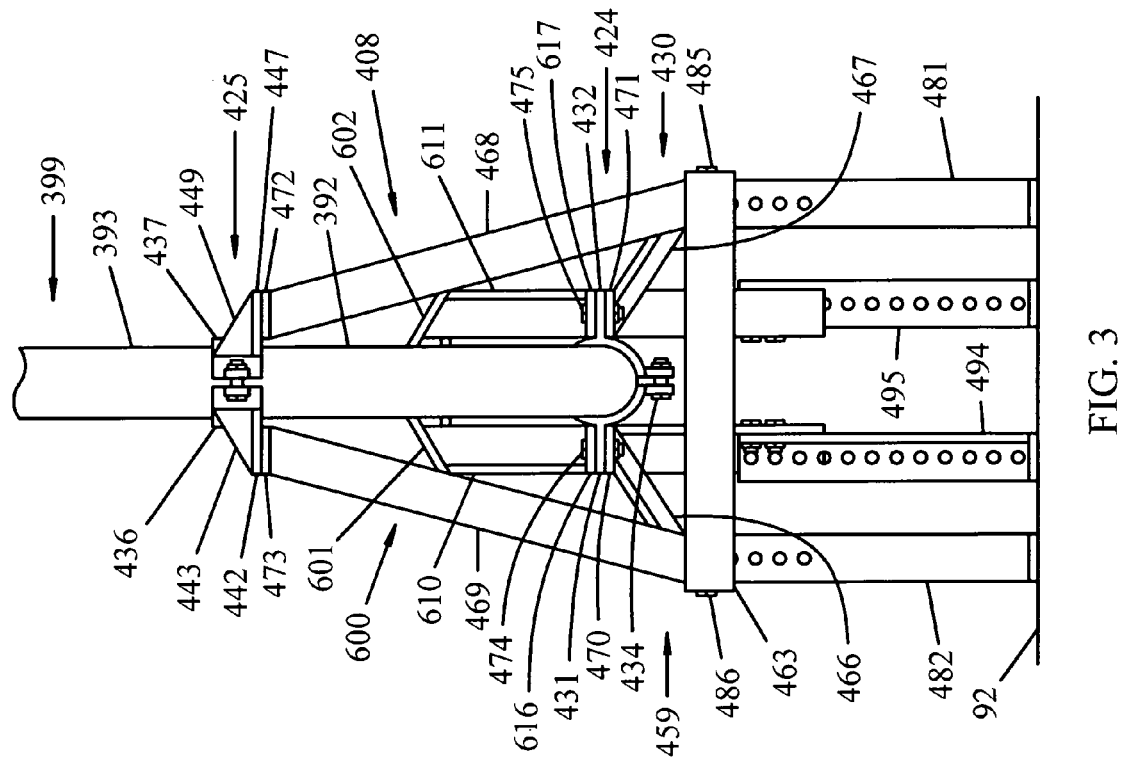

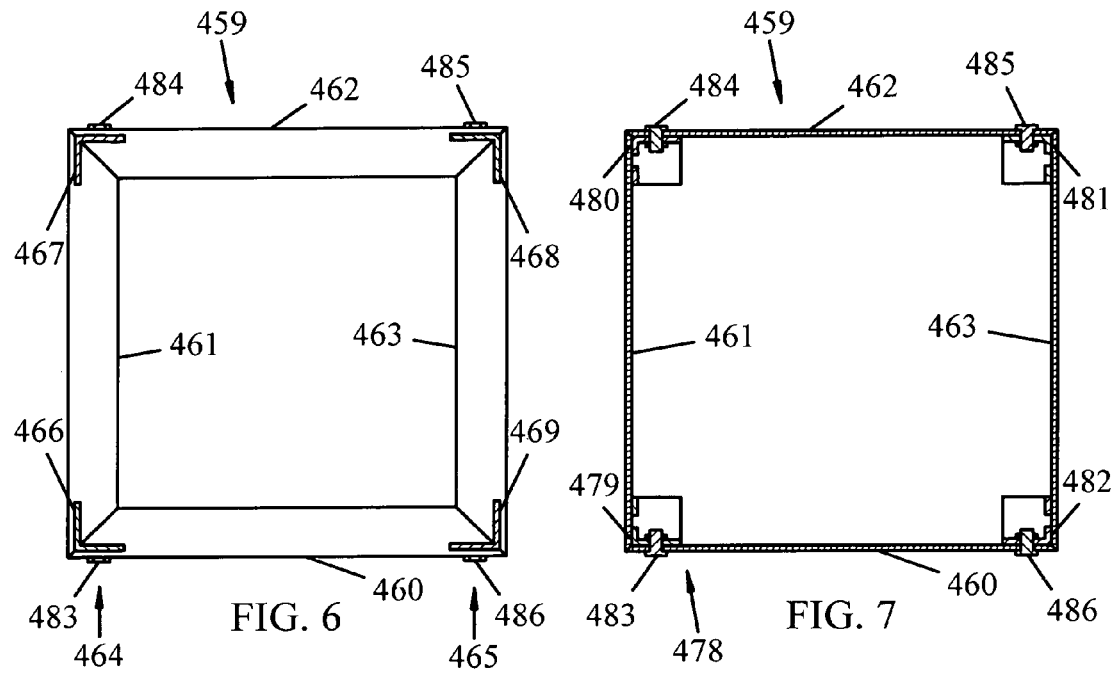
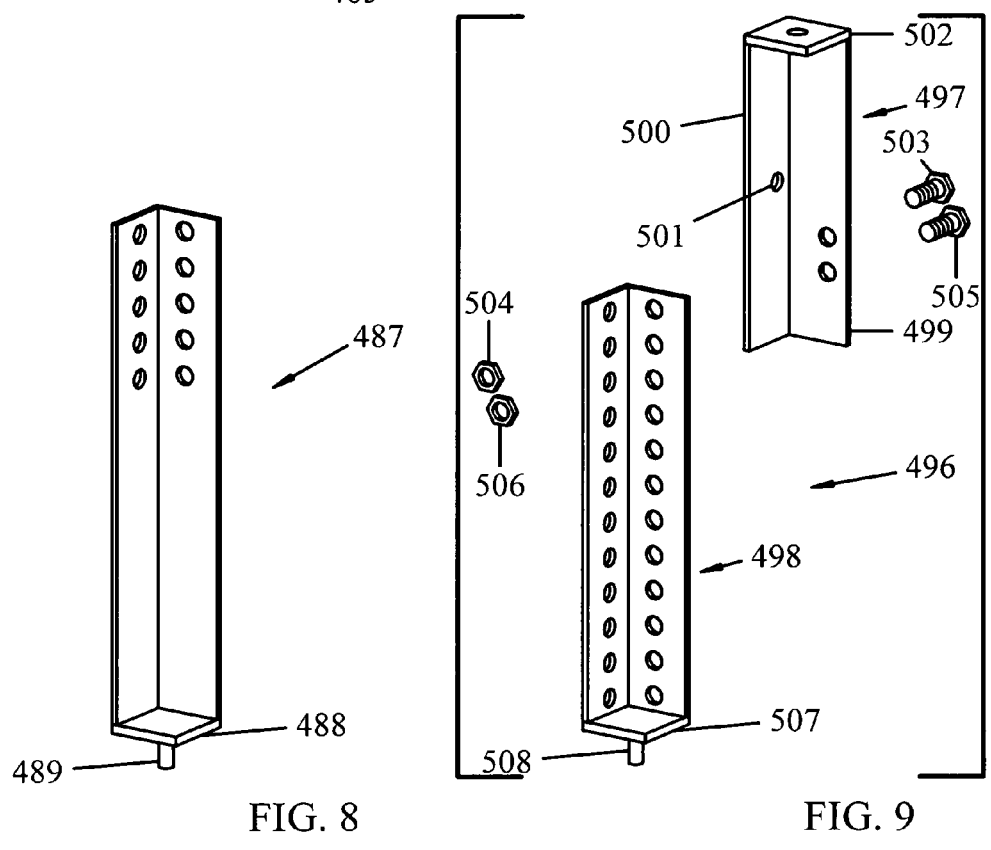

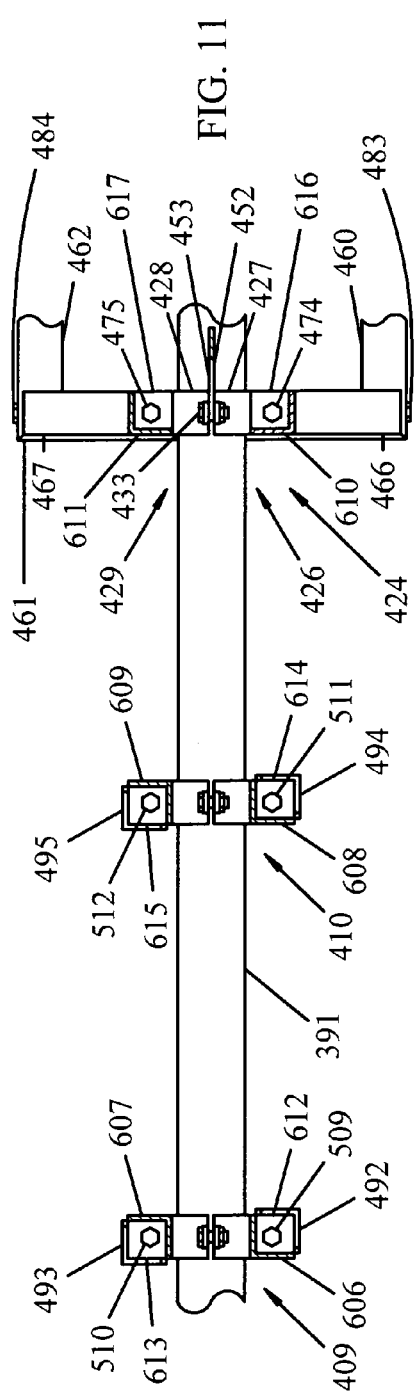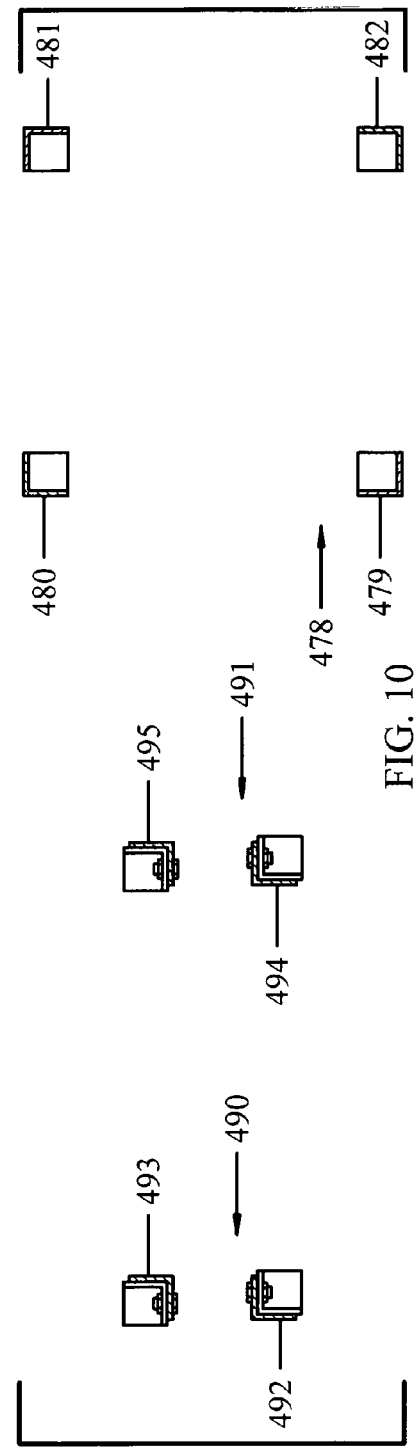

REMOVING STORED MATERIAL USING A SWEEP HAVING BUMPERS

CROSS-REFERENCE TO RELATED APPLICATIONS

This application is a divisional of application Ser. No. 14/545,885 filed Jul. 1, 2015, which is a continuation-in-part of application Ser. No. 13/999,396 filed Feb. 21, 2014, which claims the benefit of provisional application No. 61/850,770 filed Feb. 23, 2013, now abandoned, all of which are incorporated by reference.

BACKGROUND OF THE INVENTION

Field of the Invention

The present invention relates to the delivery of material being transported by a conveyor entraining the material within a flow of fluid, and in particular to the depositing of granular material by a pneumatic conveyor into a storage silo; and further relates to the method for removing the material from the silo when the silo is equipped with a bin sweep.

Background Art

Fluid flow conveyors, particularly pneumatic conveyor systems, have become a popular alternative to augers and belt conveyors for the movement of granular materials. Pneumatic conveyor systems are especially suitable for farm grains for the following reasons: grain is carried within a stream of air for less grain damage; a pneumatic conveyor is more economical to install; a pneumatic conveyor is more versatile for multiple silos and multiple silo types at a storage facility; pneumatic conveyors are sealed against water and pest infiltration between receiving point to delivery of the grain; one pneumatic conveyor system can be utilized to move a variety of grain types without cross contamination, simply by turning a valve distributor between silos; and pneumatic conveyor systems are easier to maintain.

Prior art pneumatic conveyor systems delivering grain to the top of storage silos introduce problems for these systems: a cyclone separator is required for the top of each silo; the entire system is exterior of the silo, exposing the machinery to weather-related damage; exterior supports that may be expensive must be used to support the pneumatic conveyor tubing; roof-mounted supports for the pneumatic conveyor and separator exert forces that tend to pull down the silo and collapse it; much of the pneumatic conveyor system is high above ground and not easily serviced; grain-to-grain damage occurs due to the falling of grain from the silo top to the bottom of the silo, which only increases with the height of the silo; and mixed granular materials experience product separation when dropped from the top of a silo.

Furthermore, an efficiency loss of approximately ten percent for every twenty-five feet (seven and one-half meters) of vertical rise is common to all pneumatic conveyor systems. For example, a pneumatic conveyor system used to fill a silo one hundred feet (thirty meters) tall would operate at 40% less than full efficiency (100 ft×(10%/25 ft)=40% loss; 30 m×(10%/7.5 m)=40% loss).

U.S. Pat. No. 4,082,364, Apr. 4, 1978, to Krambrock describes a method for sequentially filling a series of receiving stations from the tops thereof using a pneumatic conveyor, wherein each station is filled until the surface of the deposited material therewithin is just below the inlet thereof from the pneumatic conveyor and then this surface acts as a deflecting surface to direct the airflow entraining the material onto the next station.

U.S. Pat. No. 6,632,063, Oct. 14, 2003, to Karlsen et al. describes a system for reducing material segregation between finer and coarser material during filling of a silo from its top by controlling the entraining airflow to be a minimum, wherein the material within the silo as it is being filled can eventually reach the level of the outlet of the system for the material.

U.S. Pat. No. 4,603,769, Aug. 5, 1986, to Bach et al. describes a vertical chute for reducing grain dust with a series of vertically aligned outlets for filling a silo from its top, wherein the deposited grain blocks each outlet sequentially from lower to upper as the silo is filled.

The article *Pneumatic Conveying Systems*, course No. M05-010, no date, by A. Bhatia of Continuing Education and Development, Inc. discusses the present state of the art of pneumatic conveyors; and defines "choking" as the settling out downwardly of the entrained material from the entraining airflow when the airflow is flowing upwardly vertically in vertically oriented conveying piping, particularly before reaching the conveyor's destination and thus is to be avoided.

SUMMARY OF THE INVENTION

An objective of the present invention is to remove a major source of contamination into storage silos due to pneumatic conveyor systems by eliminating rooftop delivery of the material by the pneumatic conveyor.

Another objective is to reduce the expense of pneumatic conveyor systems by eliminating the components for rooftop delivery such as a cyclone separator and exterior supports for the pneumatic tubes.

Another objective is to increase the ease of maintenance of pneumatic conveyor systems by routing the pneumatic tubes connected to a storage silo near ground level.

Another objective is to protect the delivery system for a storage silo connected to a pneumatic conveyor from weather-related damage by locating and supporting the delivery system within the silo.

Another objective is to reduce grain-to-grain damage, and also product separation of mixed granular materials, by reducing the height through which the materials drop when deposited within a storage silo.

Another objective is to reinforce a storage silo against collapse due to the added weights and forces of the delivery system and the granular material when stored within the silo.

Another objective is to more evenly distribute the supported weight and forces of the delivery system for a storage silo and the granular material when stored within the silo, while also providing for an unobstructed floor area for mechanical or manual sweeping of the silo floor.

Another objective, when a storage silo is equipped with a bin sweep, is to protect the bin sweep from damage during the emptying of the silo that may occur due to impacting against the system that supports the system that delivers material to the silo.

The delivery system of the present invention delivers material being transported by a conveyor entraining the material within a flow of fluid. The system comprises a horizontal section and a vertical section. The vertical section comprises a tube for receiving the fluid flow entraining the material, and separators for selectively separating the material from the fluid flow. A support vertically suspends the system within a storage silo. The support comprises a plurality of spaced, removable support legs mounted in either deployed positions or stored positions. The tube, the separators, and the support are all within the silo.

The present invention reduces the average drop height of the separated material. This reduces grain-to-grain damage and also product separation of mixed granular materials. The reduction in average drop height of the separated material also increases the efficiency of the pneumatic conveyor system. Whereas a prior art pneumatic conveyor system having rooftop delivery of the material typically would have, for example, for a one-hundred-foot (thirty-meter) high silo a 40% loss of efficiency (as hereinbefore stated), the present invention with four separators bottom to top for the same silo would have a calculated loss of only 25% ((10%+20%+30%+40%)/4)=25%). This is an increase of delivery efficiency by fifteen percentage points, or 25% (((100%−25%)−(100%−40%))/(100%−40%)=125%).

An additional advantage of the present invention over the prior art is the simplicity of operation, with the separators acting automatically and with no moving parts being required for the delivery system.

A method of the present invention, when the silo is equipped with a bin sweep having bumpers, is for removing the material from the silo, and comprises extracting the material until one of the support legs is accessible out of the material, and then removing that leg from the deployed position thereof and placing that leg in the stored position thereof. The bin sweep is subsequently operated to continue to extract more of the material until one of the bumpers bumps into another of the legs that is still mounted in the deployed position thereof, and then the bin sweep is stopped. This leg is likewise removed from the deployed position thereof and placed in the stored position thereof. This sequence of operating the bin sweep until one of the bumpers bumps into another of the still-mounted support legs, stopping the bin sweep, and removing and placing that support leg in the stored position thereof continues until all of the support legs are in the stored positions thereof, providing an unobstructed silo floor. The bin sweep can then be operated to continue extracting more of the material from the silo.

BRIEF DESCRIPTION OF THE DRAWINGS

FIG. 3 is an end view of the embodiment of the present invention, as shown in FIG. 2, showing the horizontal support.

FIG. 4 is a cross-sectional view, partly broken, taken on the offset cross-sectional line 4-4 in FIG. 2 showing one clamp assembly and the support legs thereof of the horizontal support, and the deflector and one set of the stanchions thereof.

FIG. 5 is a cross-sectional view, partly broken, taken on line 5-5 in FIG. 2 showing the vertical elbow clamp assembly of the horizontal support.

FIG. 6 is a cross-sectional view taken on line 6-6 in FIG. 2 showing the subframe and the stanchions thereof of the horizontal support.

FIG. 7 is a cross-sectional view taken on line 7-7 in FIG. 2 showing the subframe and the support legs thereof of the horizontal support.

FIG. 8 is a perspective view of one embodiment of a support leg of the horizontal support as shown in FIG. 2.

FIG. 9 is a perspective, partially exploded, view of another embodiment of a support leg of the horizontal support as shown in FIG. 2.

FIG. 10 is a cross-sectional view taken on line 10-10 in FIG. 2 showing the support legs of the horizontal support.

FIG. 11 is a cross-sectional view, partly broken, taken on line 11-11 in FIG. 2 showing the stanchions of the horizontal support.

DETAILED DESCRIPTION OF THE INVENTION

Figure 1:
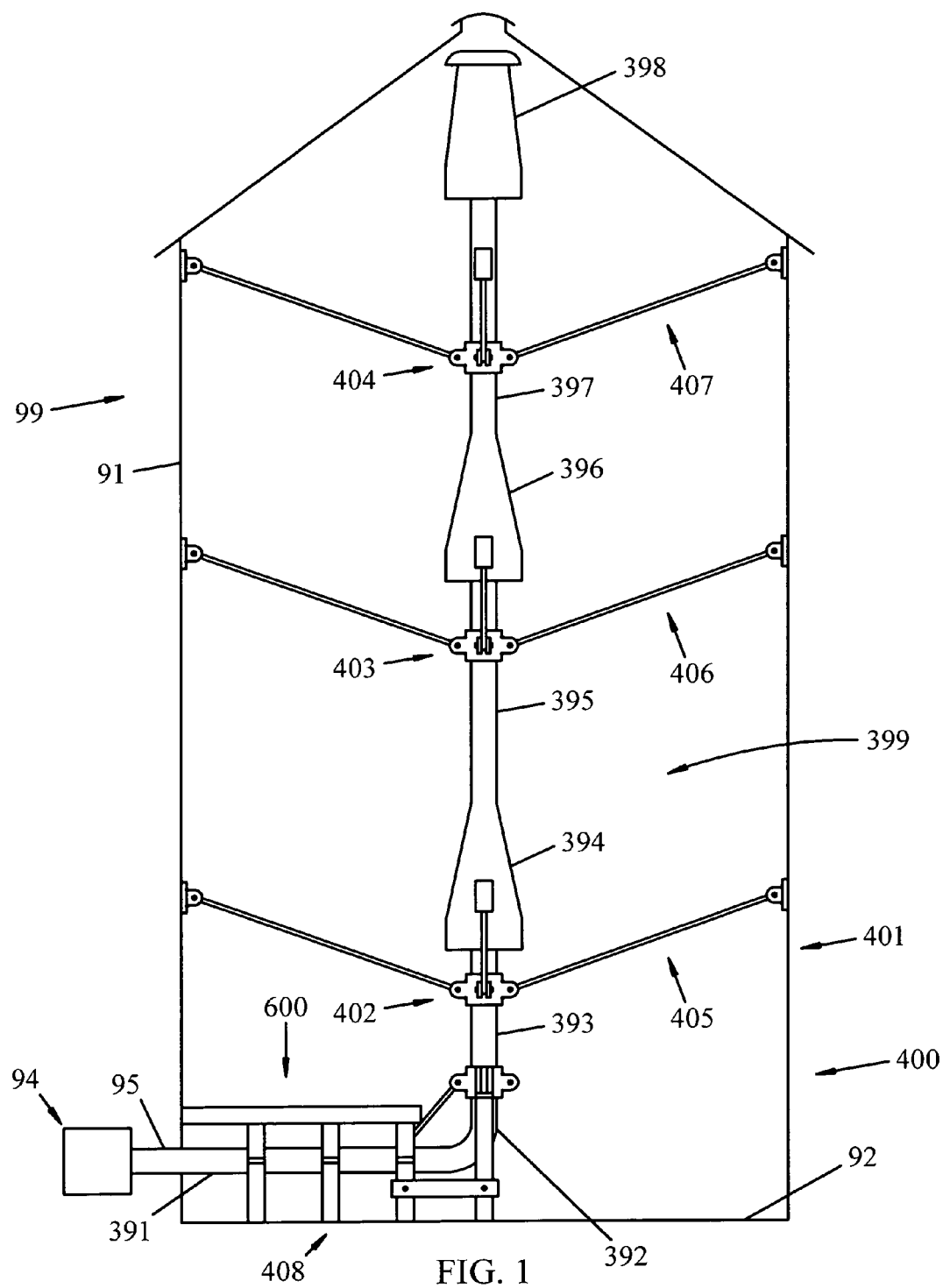
FIG. 1 is a schematic side view of one embodiment of the present invention within a storage silo comprising a vertical support comprising three clamp assemblies with braces and wall brackets, a horizontal support comprising four clamp assemblies with support legs, and a deflector.

The present invention is supported within a vertical storage silo 99 having a wall 91 and a floor 92 as shown schematically in FIG. 1. The silo 99 is for the removable storage of granular material 93, for example grain, that, when so stored, has a material surface (not shown). Although the present invention is contemplated primarily for grain, the intent of the claimed invention is to be construed to include all manner of granular material. Pelletized food products, fuels, coal, animal feeds, plastics, and fiber products are a few of the other items suitable for pneumatic conveying for removable storage.

The present invention delivers the material 93 to the silo 99 when the material is transported by a conveyor entraining the material within a flow of fluid. One embodiment of the present invention is contemplated to be used with a conventional pneumatic conveyor system that entrains the material within a flow of air for depositing the material 93 into the silo 99.

A conventional pneumatic charging system is shown generally in FIG. 1 as pneumatic conveyor 94. Pneumatic conveyor 94 is known in the art. Typically, a blower (not shown) supplies a flow of air to a rotary airlock (not shown). The rotary airlock entrains the material 93 to be conveyed into the airflow creating a pneumatic material flow that is a mixture of the airflow entraining the conveyed material to be propelled toward the silo 99. The pneumatic conveyor 94 connects to a tube 95 for conveying of the pneumatic material flow. The tube 95 is a pneumatic transfer tube known in the art.

The present invention comprises an outlet of the pneumatic conveyor 94. One embodiment of the present invention is shown schematically in FIG. 1 as, generally, a delivery system 399. The delivery system 399 has a horizontal section and a vertical section and at least an elbow interconnecting the horizontal and vertical sections that together comprise a series of tubes and separators within the silo 99. A support system 400 supports the delivery system 399 within the silo 99. The tube 95 connects to a horizontal tube 391 of the horizontal section of the delivery system 399 for conveying the pneumatic material flow into the silo 99. The horizontal tube 391 may be slightly angled from being exactly horizontal, either upwardly or downwardly, to improve and maintain the pneumatic material flow to provide maximum conveyance of the material. The horizontal tube 391 enters the silo 99 through a lower portion of the silo wall 91. An elbow 392 interconnects the horizontal tube 391 and a vertical tube 393 of the vertical section for conveying the pneumatic material flow upwardly within the silo 99. The vertical tube 393 is located at and along the vertical center of the silo 99.

The vertical tube 393 is connected to an upstream separator 394 of the vertical section of the delivery system 399 by slipping into the upstream separator 394. The upstream separator 394 comprises a vertical tube 395 for conveying the pneumatic material flow upwardly from the upstream separator 394. The upstream separator 394 selectively either separates the material from the airflow and deposits the separated material 93 into the silo 99; or else flows the pneumatic material flow through the upstream separator 394, without separating the material from the airflow, and into the vertical tube 395.

In the embodiment shown in FIG. 1, the vertical tube 395 is connected to a downstream separator 396 of the vertical section of the delivery system 399 by slipping into the downstream separator 396. The downstream separator 396 is vertically above the upstream separator 394 and downstream of the upstream separator 394. The downstream separator 396 comprises a vertical tube 397 for conveying the pneumatic material flow upwardly from the downstream separator 396. The downstream separator 396 selectively either separates the material from the airflow and deposits the separated material 93 into the silo 99 onto the separated material 93 deposited by the upstream separator 394; or else flows the pneumatic material flow through the downstream separator 396, without separating the material from the airflow, and into the vertical tube 397.

The vertical tube 397, in the embodiment shown in FIG. 1, connects to a top separator 398 of the vertical section of the delivery system 399 that is vertically above both the upstream separator 394 and the downstream separator 396 and that is downstream of the downstream separator 396. The top separator 398 comprises an open cap on the top of the top separator 398. The top separator 398 selectively either separates the material from the airflow and deposits the separated material 93 into the silo 99 onto the separated material 93 deposited by both the upstream separator 394 and the downstream separator 396; or else flows the pneumatic material flow through the top separator 398, without separating the material from the airflow, toward the cap.

One embodiment, not shown, of a material separator of the present invention that is not a top separator, that, for the embodiment shown in FIG. 1, can be any separator of the delivery system 399 that is not the top separator 398, has an inlet, an outlet below the inlet, and a cylindrical outlet tube above the inlet. The outlet tube is generally cylindrical in its entirety, and has the same outside diameter as the outside diameter of the vertical tube. For the embodiment shown in FIG. 1, the outlet tube can be any of the vertical tube that any of the separators of the delivery system 399, that is not the top separator 398, comprises. The material separator includes an inlet tube forming the inlet at the upper end of the inlet tube. The lower end of the inlet tube is below the outlet. The inside diameter of the inlet tube is greater than the outside diameter of the vertical tube. The vertical tube thus slips into the inlet tube of the material separator. The material separator has a metal wall that interconnects the outlet and the outlet tube. The wall forms a cylindrical base and a forcing cone above the cylindrical base. The inside diameter of the cylindrical base is greater than the outside diameter of the inlet tube, forming the outlet at the lower end of the cylindrical base. A plurality of webs structurally interconnect and space apart the cylindrical base and the inlet tube, thus together with the inlet tube and the wall interconnecting together the inlet, the outlet, and the outlet tube. The forcing cone tapers upwardly and inwardly to the outlet tube, forming a through aperture between the forcing cone and the outlet tube. The inlet, the outlet, the inlet tube, the cylindrical base, essentially the entire forcing cone, and the webs are all vertically below the through aperture on the proximal side of the through aperture. Essentially the entire outlet tube is vertically above the through aperture on the distal side of the through aperture.

The material separator, the inlet, the outlet, the through aperture, the outlet tube, and the inlet tube are coaxial. The relative sizes of the material separator may be different based upon which specific granular material 93 is primarily to be delivered to the silo 99. For example, for grain, in the embodiment of the material separator, the cylindrical base has an inside diameter about three times the outside diameter of the inlet tube, and the axial distance between the outlet and the through aperture is approximately six times the diameter of the inlet.

In one embodiment, not shown, of the top separator of the present invention, a vertical tube conveys the pneumatic material flow upwardly, from upstream of the top separator 398, downstream into the top separator 398. The vertical tube conveys the pneumatic material flow from the uppermost material separator of the delivery system 399 that is not the top separator 398. For the embodiment shown in FIG. 1, that vertical tube is the vertical tube 397 shown in FIG. 1 that the downstream separator 396 (which is the uppermost separator that is not the top separator 398) of the delivery system 399 comprises.

The top separator has an inlet, a first outlet below the top separator inlet, and a second outlet above the top separator inlet. The vertical tube extends into and terminates within the top separator forming the top separator inlet at the upper end of the vertical tube. The top separator has a metal wall that interconnects the first and second outlets thereof. The wall forms a cylindrical base and a cone above this cylindrical base. The inside diameter of this cylindrical base is greater than the outside diameter of the vertical tube, forming the first outlet of the top separator at the lower end of this cylindrical base. A plurality of webs structurally interconnect and space apart this cylindrical base and the vertical tube, thus together with the vertical tube and the top separator wall interconnecting together the inlet thereof, the first outlet thereof, and the second outlet thereof. The top separator cone tapers upwardly and inwardly to a diameter about two times the diameter of the top separator inlet at the top separator second outlet. An open cap is at the top separator second outlet and has a stem. A plurality of webs interconnect and space apart the stem and the top separator cone at the top separator second outlet, centering the stem into the top separator second outlet. The open cap is mushroom shaped, blocking continued vertical flow, and redirects any flow through the top separator second outlet downwardly and out of the top separator.

The top separator, the inlet thereof, the first outlet thereof, and the second outlet thereof are coaxial. The relative sizes of the top separator may be different based upon which specific granular material 93 is primarily to be delivered to the silo 99. For example, for grain, in the embodiment of the top separator, the cylindrical base thereof has an inside diameter about three times the outside diameter of the vertical tube. The overall height of the top separator is about six times the diameter of the inlet thereof.

The support system 400 comprises a vertical support 401 and a horizontal support 408. The vertical support 401 suspends and centers the delivery system 399 within the silo 99, and reinforces the silo 99 against collapse. The horizontal support 408 selectively supports the delivery system 399 upon the floor 92 of the silo 99. The supported weight and forces of the delivery system 399 and the material 93 when stored within the silo 99 are distributed between the vertical support 401 and the horizontal support 408.

The vertical support 401 has a plurality of clamp assemblies mounted on the vertical tubes of the vertical section of the delivery system 399; and in particular, for the embodiment shown in FIG. 1, clamp assemblies 402, 403, and 404. The clamp assembly 402 is positioned on the vertical tube 393 near the upstream separator 394 for suspending and centering the vertical tube 393 within the silo 99. The clamp assembly 403 is positioned on the vertical tube 395 near the downstream separator 396 for suspending and centering the vertical tube 395 and the upstream separator 394 within the silo 99. The clamp assembly 404 is positioned on the vertical tube 397 for suspending and centering the vertical tube 397 and the downstream separator 396 within the silo 99. The vertical support 401 further includes wall brackets on the silo wall 91, and sets 405, 406, and 407 of braces interconnecting the clamp assemblies 402, 403, and 404, respectively, with the wall brackets on the silo wall 91, thereby suspending and centering the vertical tubes and the separators of the delivery system 399 within the silo 99. The braces of each set of braces of the vertical support 401 are evenly spaced around the respective vertical tube. For each clamp assembly, the respective wall brackets are evenly spaced on, and connected to, the inner surface of the silo wall 91 on a horizontal plane above the height of the clamp assembly thereof. The silo wall 91 is thus interconnected throughout and within the silo 99 by the vertical support 401, specifically, for the embodiment shown in FIG. 1, the clamp assemblies 402, 403, and 404, the sets 405, 406, and 407 of the braces, and the respective wall brackets therefor, simultaneously reinforcing the silo wall 91 against collapse of the silo 99 as well as supporting the delivery system 399.

The clamp assemblies of the vertical support 401 are identical with each other. Each clamp assembly of the vertical support 401 includes a clamp. Each clamp has an inside circumference less than the outside circumference of the respective vertical tube. Each clamp is composed of metal plate or metal casting. Each clamp is a union of two equal half clamps. Each half clamp has an outwardly radiating end flange on one end for forming an end bracket, and an outwardly radiating end flange on the other end for forming another end bracket. Each half clamp also has one or more side brackets evenly spaced between the ends of that half clamp. Each side bracket has two flanges closely spaced to, and parallel with, each other. Each side bracket has one aligning through hole formed by aligned holes in the flanges thereof. When the half clamps for each clamp are mounted onto the respective vertical tube, the end flanges of those half clamps are adjacent to each other, forming the end brackets thereof. Aligning through holes of the end brackets thereof are formed by aligned holes in the end flanges, respectively.

The wall brackets of the vertical support 401 are identical with each other. Each wall bracket is a metal or metal casting fixture. Each wall bracket has a base and two parallel flanges. Each of the flanges has, aligned holes, forming an aligning through hole. Each wall bracket base has two or more holes. The wall brackets are mechanically fastened or bolted to the silo wall 91.

The sets of the braces of the vertical support 401 are identical with each other. Each brace is a metal rod or cable having two end holes, one each for the inner end thereof and the outer end thereof, for receiving fasteners or bolts as connectors and are secured, as by nuts when bolts are used. Each brace has a length equal to or greater than the radius of the silo 99, and extends radially upwardly and outwardly from the clamp assembly thereof to the wall brackets. The clamp brackets each receives the inner end of one of the braces, respectively, and retains that inner end therein by a bolt passing through the aligning through hole of the clamp bracket and the inner end hole of the brace, respectively. The wall brackets each receives the outer end of one of the braces, respectively, and retains that outer end therein by a bolt passing through the aligning through hole of the wall bracket and the outer end hole of the brace, respectively. The braces thus equally connect the brackets of each of the clamps of the clamp assemblies of the vertical support 401 to the silo wall 91.

Figure 2:
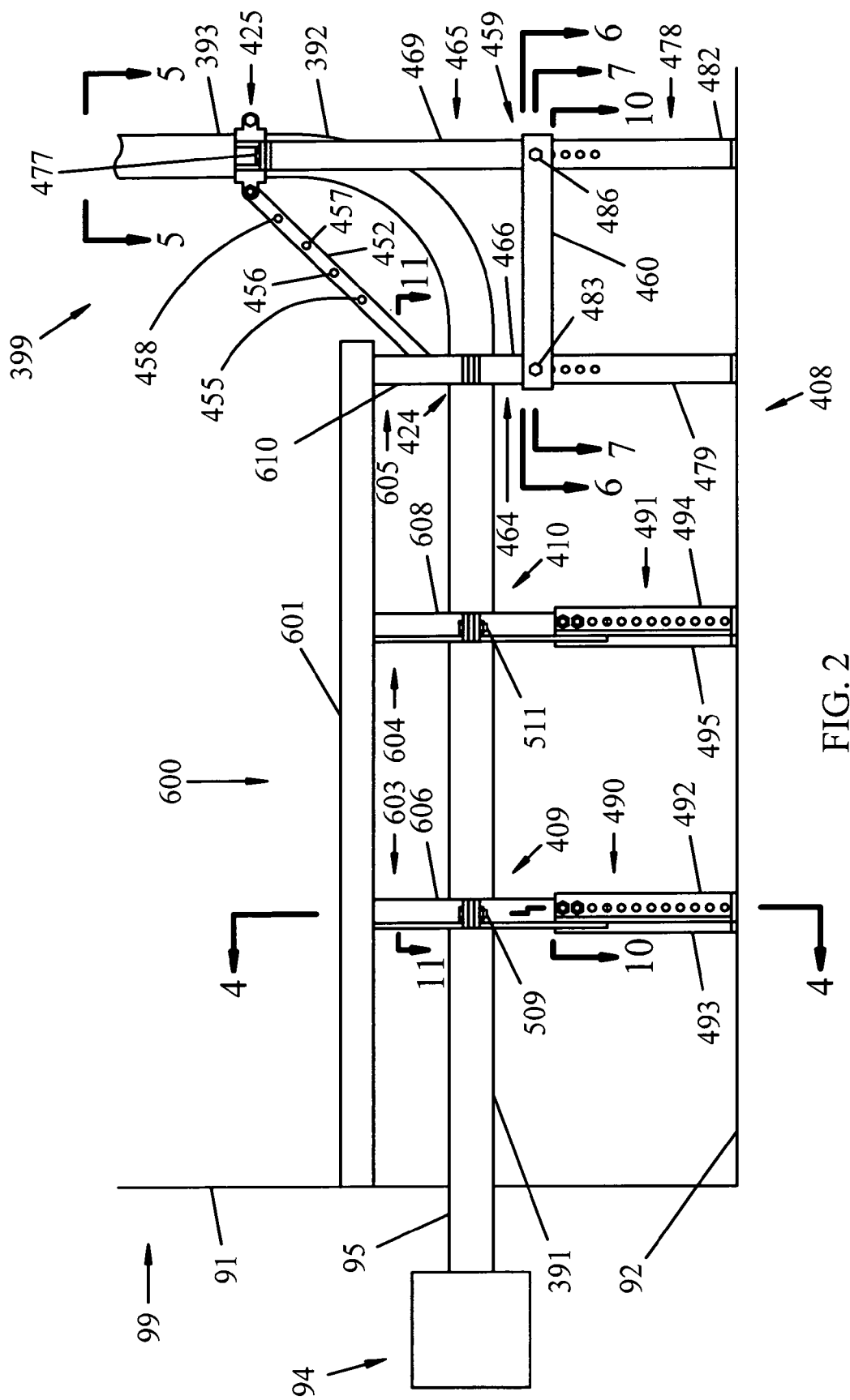
FIG. 2 is a side view of the embodiment of the present invention, as shown in FIG. 1, within the storage silo, partly schematically and broken, showing the horizontal support comprising four clamp assemblies, support legs in deployed positions, a subframe, stanchions, and a deflector.

The horizontal support 408 has a plurality of clamp assemblies mounted on the horizontal tube 391 of the horizontal section of the delivery system 399; and in particular, for the embodiment shown in FIG. 2, clamp assemblies 409 and 410. The clamp assemblies of the horizontal support 408 mounted on the horizontal tube 391 are identical with each other; and, as such, the clamp assembly 409 is typical. The clamp assembly 409 is shown in greater detail in FIG. 4.

The clamp assembly 409 comprises a clamp 411 having an inside circumference less than the outside circumference of the horizontal tube 391. The clamp 411 is composed of metal plate or metal casting. The clamp 411 is a union of two equal half clamps 412 and 413.

The half clamp 412 has an outwardly radiating end flange 416 on one end for forming an end bracket 414, and an outwardly radiating end flange 417 on the other end for forming an end bracket 415. The half clamp 412 has a side flange 418 evenly spaced between the ends of the half clamp 412 that is radially perpendicular to the outer surface of the half clamp 412, extending across the width of the half clamp 412. Each of the flanges 416, 417, and 418 has a through hole therein.

The half clamp 413 has an outwardly radiating end flange 419 on one end for forming the end bracket 415, and an outwardly radiating end flange 420 on the other end for forming the end bracket 414. The half clamp 413 has a side flange 421 evenly spaced between the ends of the half clamp 413 that is radially perpendicular to the outer surface of the half clamp 413, extending across the width of the half clamp 413. Each of the flanges 419, 420, and 421 has a through hole therein.

When the half clamps 412 and 413 are mounted onto the horizontal tube 391, as shown in FIG. 4, the end flange 416 of the half clamp 412 and the end flange 420 of the half clamp 413 are adjacent to each other, forming the end bracket 414; and the end flange 417 of the half clamp 412 and the end flange 419 of the half clamp 413 are adjacent to each other, forming the end bracket 415. The through holes in the end flanges 416 and 420 are aligned, forming an aligning through hole of the end bracket 414; and the through holes in the end flanges 417 and 419 are aligned, forming an aligning through hole of the end bracket 415. Fasteners or bolts 422 and 423 pass through the through holes of the end brackets 414 and 415, respectively; and are secured, as by nuts when bolts are used, joining together the half clamps 412 and 413 to form the clamp 411.

As shown in FIG. 2 and FIG. 3, the horizontal support 408 further includes a horizontal elbow clamp assembly 424 mounted on the horizontal tube 391 adjacent the elbow 392, and a vertical elbow clamp assembly 425 mounted on the vertical tube 393 adjacent the elbow 392. The horizontal elbow clamp assembly 424, shown in FIG. 2, FIG. 3, and FIG. 11, is identical with the clamp assemblies of the horizontal support 408 mounted on the horizontal tube 391; and comprises, identically, a clamp 426 that is a union of two equal half clamps 427 and 428 joined together by fasteners or bolts 433 and 434 passing through holes of end brackets 429 and 430, respectively, that are secured, as by nuts when bolts are used. Each half clamp 427 and 428 likewise identically has a side flange 431 and 432, respectively, having a through hole therein.

The vertical elbow clamp assembly 425, as shown in FIG. 2 and FIG. 3 and in more detail in FIG. 5, comprises a clamp 435 having an inside circumference less than the outside circumference of the vertical tube 393. The clamp 435 is composed of metal plate or metal casting. The clamp 435 is a union of two equal half clamps 436 and 437.

The half clamp 436 has an outwardly radiating end flange 440 on one end for forming an end bracket 438, and an outwardly radiating end flange 441 on the other end for forming an end bracket 439. The half clamp 436 has a side flange 442. The side flange 442 is circumferentially perpendicular to the outer surface of the half clamp 436, extending along the circumferential arc length between the ends of the half clamp 436, and projects horizontally outwardly from the side of the half clamp 436. The side flange 442 is located at about the lower edge of the half clamp 436, and evenly spaced between the ends of the half clamp 436. Reinforcing gussets 443 and 444, generally triangularly shaped, interconnect the upper surface of the side flange 442 and the outer surface of the half clamp 436 for reinforcing the side flange 442 from deflecting vertically. Each of the flanges 440, 441, and 442 has a through hole therein.

The half clamp 437 has an outwardly radiating end flange 445 on one end for forming the end bracket 439, and an outwardly radiating end flange 446 on the other end for forming the end bracket 438. The half clamp 437 has a side flange 447. The side flange 447 is circumferentially perpendicular to the outer surface of the half clamp 437, extending along the circumferential arc length between the ends of the half clamp 437, and projects horizontally outwardly from the side of the half clamp 437. The side flange 447 is located at about the lower edge of the half clamp 437, and evenly spaced between the ends of the half clamp 437. Reinforcing gussets 448 and 449, generally triangularly shaped, interconnect the upper surface of the side flange 447 and the outer surface of the half clamp 437 for reinforcing the side flange 447 from deflecting vertically. Each of the flanges 445, 446, and 447 has a through hole therein.

When the half clamps 436 and 437 are mounted onto the vertical tube 393, as shown in FIG. 5, the end flange 440 of the half clamp 436 and the end flange 446 of the half clamp 437 are adjacent to each other, forming the end bracket 438; and the end flange 441 of the half clamp 436 and the end flange 445 of the half clamp 437 are adjacent to each other, forming the end bracket 439. The through holes in the end flanges 440 and 446 are aligned, forming an aligning through hole of the end bracket 438; and the through holes in the end flanges 441 and 445 are aligned, forming an aligning through hole of the end bracket 439. Fasteners or bolts 450 and 451 pass through the through holes of the end brackets 438 and 439, respectively, and are secured, as by nuts when bolts are used, joining together the half clamps 436 and 437 to form the clamp 435.

The horizontal support 408 further includes an elbow brace 452 interconnecting the horizontal elbow clamp assembly 424 and the vertical elbow clamp assembly 425 above the elbow 392, as shown in FIG. 2, FIG. 5, and FIG. 11, for reinforcing the elbow clamp assemblies 424 and 425. The elbow brace 452 is a metal rod or bar having a lower end 453, an upper end 454, and two end holes, one each for the ends 453 and 454 thereof, for receiving the fasteners or bolts 433 and 451, respectively. The elbow brace 452 has a plurality of storing holes 455, 456, 457, and 458 along the length thereof. The clamp end bracket 429 of the horizontal elbow clamp assembly 424 receives the lower end 453 of the elbow brace 452 and retains the lower end 453 therein by the bolt 433 passing through the through hole of the clamp end bracket 429 and the lower end hole of the elbow brace 452. The clamp end bracket 439 of the vertical elbow clamp assembly 425 receives the upper end 454 of the elbow brace 452 and retains the upper end 454 therein by the bolt 451 passing through the through hole of the clamp end bracket 439 and the upper end hole of the elbow brace 452.

The horizontal support 408 further includes a subframe 459 that also interconnects and reinforces the horizontal elbow clamp assembly 424 and the vertical elbow clamp assembly 425. The subframe 459 is below the elbow 392, and extends underneath and between the horizontal elbow clamp assembly 424 and the vertical elbow clamp assembly 425.

The subframe 459 comprises a plurality of interconnected girders, and in particular, for the embodiment shown in FIG. 2, FIG. 3, FIG. 6, and FIG. 7, girders 460, 461, 462, and 463. The subframe 459 has a generally rectangular plan shape, either of unequal length and width or, as shown for girders 460, 461, 462, and 463, equal length and width forming a square. Each of the girders 460, 461, 462, and 463 is metal and has an angle cross section of either unequal or, as shown, equal flange length, and may be angle iron for ease and simplicity of construction. For the embodiment shown in FIG. 2, FIG. 3, FIG. 6, and FIG. 7, each of the girders 460, 461, 462, and 463 has a first of the flanges thereof oriented horizontally and on top, and a second of the flanges thereof oriented vertically and on the outer side of the subframe 459. The ends of each of the girders 460, 461, 462, and 463 are cut at angles and joined together, as by welding, forming the rectangle of the subframe 459. The subframe 459 has through holes near each end of each of the girders 460 and 462 in the vertically oriented flanges thereof that are parallel with the elbow 392.

The subframe 459 further includes an inner set 464 of stanchions 466 and 467, and an outer set 465 of stanchions 468 and 469. Each of the stanchions 466, 467, 468, and 469 is metal and has an angle cross section of either unequal or, as shown, equal flange length, and may be angle iron for ease and simplicity of construction. Each of the stanchions 466, 467, 468, and 469 has first and second flanges thereof oriented outwardly adjacent the outer side of the subframe 459, as shown in FIG. 6. The stanchions 466, 467, 468, and 469 are attached at the lower ends thereof to the girders 460, 461, 462, and 463, as by welding, on the tops of the girders 460, 461, 462, and 463, and offset inwardly from the outer side of the subframe 459, as shown in FIG. 6, by an amount equal to the thickness of the vertically oriented flanges of the girders 460, 461, 462, and 463. Alternatively, a foot may be attached, as by welding, to the lower end of each of the stanchions, respectively, and then the feet so attached to the girders and so offset inwardly. Each of the stanchions 466, 467, 468, and 469 has a cap 470, 471, 472, and 473 attached to the upper end thereof, respectively, as by welding. Each of the caps 470, 471, 472, and 473 may be a flat plate, as shown, for ease and simplicity of construction. Each of the caps 470, 471, 472, and 473 has a through hole therein.

The inner set 464 of the stanchions 466 and 467 interconnect the horizontal elbow clamp assembly 424 and the girders 460, 461, 462, and 463 of the subframe 459. The outer set 465 of the stanchions 468 and 469 interconnect the vertical elbow clamp assembly 425 and the girders 460, 461, 462, and 463 of the subframe 459. The through holes in the side flanges 431 and 432 of the horizontal elbow clamp assembly 424 align with the through holes in the caps 470 and 471 for connecting the caps 470 and 471 with the horizontal elbow clamp assembly 424; and the through holes in the side flanges 447 and 442 of the vertical elbow clamp assembly 425 align with the through holes in the caps 472 and 473 for connecting the caps 472 and 473 with the vertical elbow clamp assembly 425. As shown in FIG. 2, FIG. 3, and FIG. 5, fasteners or bolts 474, 475, 476, and 477 pass through the aligned through holes of the side flanges 431, 432, 447, and 442 and the caps 470, 471, 472, and 473, respectively, and are secured, as by nuts when bolts are used, attaching together the elbow clamp assemblies 424 and 425 and the subframe 459. As shown in FIG. 3, the stanchions 466, 467, 468, and 469 are angled from the vertical.

The horizontal support 408 also includes a set 478 of removable support legs 479, 480, 481, and 482 attachable to the subframe 459 for selectively supporting the delivery system 399 upon the floor 92 of the silo 99 by selectively supporting the subframe 459 of the horizontal support 408 of the support system 400 upon the silo floor 92. Each of the removable support legs 479, 480, 481, and 482 has first and second flanges thereof oriented outwardly adjacent the outer side of the subframe 459, as shown in FIG. 7. Fasteners or bolts 483, 484, 485, and 486 pass through the through holes in the girders 460 and 462 that align with through holes in the flanges of the removable support legs 479, 480, 481, and 482, respectively, and are secured, as by nuts when bolts are used, attaching the removable support legs 479, 480, 481, and 482 to the subframe 459. When so attached, the upper ends of the removable support legs 479, 480, 481, and 482 are against the inner surfaces of the horizontally oriented flanges of the girders 460, 461, 462, and 463 of the subframe 459, and the flanges of the removable support legs 479, 480, 481, and 482 are against the inner surfaces of the vertically oriented flanges of the girders 460, 461, 462, and 463 of the subframe 459, offsetting the upper ends thereof inwardly from the outer side of the subframe 459, as shown in FIG. 7, by an amount equal to the thickness of the vertically oriented flanges of the girders 460, 461, 462, and 463, so that the upper ends of the removable support legs 479, 480, 481, and 482 are directly below the lower ends of the stanchions 466, 467, 468, and 469.

One embodiment of the removable support legs 479, 480, 481, and 482 comprises an integral support leg 487, shown in more detail in FIG. 8, that is premeasured for length to correctly space the subframe 459 from the silo floor 92 for selectively supporting the delivery system 399 upon the silo floor 92. The support leg 487 is metal and has an angle cross section of either unequal or, as shown, equal flange length, and may be angle iron for ease and simplicity of construction. The support leg 487 has a plurality of through holes in both flanges thereof either in only the upper portion as shown, or alternatively along the full length thereof. One of the through holes in one of the flanges of the support leg 487 aligns with one of the through holes in one of the girders 460 and 462 for receiving one of the fasteners or bolts 483, 484, 485, and 486. The support leg 487 has a foot 488 attached to the lower end thereof, as by welding. The foot 488 may be a flat plate, as shown, for ease and simplicity of construction. The foot 488 has a locking pin 489 attached, as by welding, to the lower surface thereof.

The horizontal support 408 also includes a set of removable support legs attachable to each of the clamp assemblies thereof for selectively supporting the delivery system 399 upon the floor 92 of the silo 99 by selectively supporting the clamp assemblies of the horizontal support 408 of the support system 400 upon the silo floor 92; and in particular, for the embodiment shown in FIG. 2, sets 490 and 491 of removable support legs 492 and 493, and 494 and 495 for the clamp assemblies 409 and 410, respectively.

One embodiment of the removable support legs 492 and 493, and 494 and 495 comprises a separable support leg 496, shown in more detail in FIG. 9. The support leg 496 comprises an upper leg section 497 and a lower leg section 498. The upper leg section 497 is metal and has an angle cross section of either unequal or, as shown, equal flange length, and may be angle iron for ease and simplicity of construction. The upper leg section 497 has two through holes in a first flange 499 thereof, and a storing hole 501 in a second flange 500 thereof. The upper leg section 497 has a cap 502 attached to the upper end thereof, as by welding. The cap 502 may be a flat plate, as shown, for ease and simplicity of construction. The cap 502 has a through hole therein. The upper leg section 497 has a standard length and configuration.

The lower leg section 498 is metal and has an angle cross section of either unequal or, as shown, equal flange length, and may be angle iron for ease and simplicity of construction. The lower leg section 498 has a plurality of through holes in both flanges thereof along the full length thereof. Fasteners or bolts 503 and 505 pass through the two through holes in the first flange 499 of the upper leg section 497 that align with two of the through holes in one of the flanges of the lower leg section 498, respectively, and are secured, as by nuts 504 and 506 when bolts are used, attaching the leg sections 497 and 498 together, forming the support leg 496. When so attached, the flanges of the lower leg section 498 are against the inner surfaces of the flanges of the upper leg section 497, offsetting the lower end of the lower leg section 498 from the upper end of the upper leg section 497 by an amount equal to the thickness of the flanges of the upper leg section 497.

In the embodiment of the support leg 496 as shown in FIG. 9, the lower leg section 498 is of stock material. The correct length is measured, at the silo 99 either during or after installation of the delivery system 399 or the support system 400 or any other convenient time such as when any of the removable support legs 492, 493, 494, or 495 or leg sections thereof are replaced, to correctly space each of the clamp assemblies of the horizontal support 408 of the support system 400 from the silo floor 92 for selectively supporting the delivery system 399 upon the silo floor 92. After the correct length has been measured, the lower leg section 498 is cut from the stock material, and a foot 507 is attached to the lower end thereof, as by welding. The foot 507 may be a flat plate, as shown, for ease and simplicity of construction. The foot 507 has a locking pin 508 attached, as by welding, to the lower surface thereof.

The through holes in the side flanges of the clamp assemblies 409 and 410 of the horizontal support 408 align with the through holes in the caps of the removable support legs 492 and 493, and 494 and 495. As shown in FIG. 2 and FIG. 11, fasteners or bolts 509, 510, 511, and 512 pass through the aligned through holes of these side flanges and these caps, respectively, and are secured, as by nuts when bolts are used, attaching the removable support legs 492 and 493, and 494 and 495 to the clamp assemblies 409 and 410. When so attached, as shown in FIG. 10, the removable support legs 492 and 493, and 494 and 495 are oriented so that the flanges through which the fasteners or bolts 503 and 505 pass to attach the respective leg sections 497 and 498 together are oriented inwardly, parallel with the horizontal section of the delivery system 399, and the other flanges thereof are oriented perpendicularly outwardly. Each upper leg section 497 of the respective removable support legs 492 and 493, and 494 and 495 of each of the sets 490 and 491 thereof are horizontally aligned with each other and the clamp assemblies 409 and 410 thereof, respectively, when so attached; however, due to the offsetting of the lower leg section 498 from the upper leg section 497 of the respective removable support legs 492 and 493, and 494 and 495, the respective lower leg section 498 of each of the sets 490 and 491 of the removable support legs 492 and 493, and 494 and 495 are horizontally offset.

The removable support legs of the horizontal support 408 are rotationally symmetric. As shown in FIG. 10, and further shown in FIG. 2, FIG. 3, and FIG. 7, the removable support legs 479, 480, 481, and 482 that are attachable to the subframe 459 differ from each other only in orientation by a rotation of ninety degrees, in order from leg 479 to leg 480 to leg 481 to leg 482, about an axis that is parallel with both flanges of the respective removable support leg. As shown in FIG. 10, and further shown in FIG. 2, FIG. 3, and FIG. 4, the removable support legs 492 and 493, and 494 and 495 of each of the sets 490 and 491 thereof that are attachable to the clamp assemblies 409 and 410, respectively, differ from each other only in orientation by a rotation of one hundred eighty degrees, in order from leg 492 to leg 493 and from leg 494 to leg 495, about an axis that is parallel with both flanges of the respective removable support leg. This simplifies construction and maintenance by not requiring to have right-hand and left-hand variants of the removable support legs of the horizontal support 408.

Another embodiment of the removable support legs that are attachable to the subframe 459 comprises a separable support leg, based upon measurements made at the silo 99, identical to the separable support leg 496 hereinbefore described and as shown in FIG. 9 but lacking the cap 502 thereof. Yet other embodiments of the removable support legs that are attachable to the subframe 459 comprise either an integral support leg, identical to the integral support leg 487 hereinbefore described and as shown in FIG. 8, or a separable support leg, identical to the separable support leg 496 hereinbefore described and as shown in FIG. 9, but that also includes a cap attached to the upper end thereof, as by welding.

Another embodiment of the removable support legs that are attachable to the clamp assemblies of the horizontal support 408 comprises a premeasured integral support leg, identical to the integral support leg 487 hereinbefore described and as shown in FIG. 8 but including a cap identically as the separable support leg 496 has the cap 502 hereinbefore described and as shown in FIG. 9.

The removable support legs of the horizontal support 408 selectively support the delivery system 399 upon the floor 92 of the silo 99. Each of the removable support legs is attachable to the horizontal support 408 in either a deployed position thereof or a stored position thereof. When in the deployed positions thereof, the removable support legs of the horizontal support 408 interconnect the horizontal support 408 and the silo floor 92, supporting the delivery system 399 thereupon. The removable support legs of the horizontal support 408 are removable from the deployed positions thereof, and may be placed in the stored positions thereof on the horizontal support 408, to provide an unobstructed floor area for mechanical or manual sweeping of the silo floor 92.

FIG. 2 shows the deployed positions of the removable support legs of the horizontal support 408. For the set 478 of the removable support legs 479, 480, 481, and 482 that are attachable to the subframe 459, the fasteners or bolts 483, 484, 485, and 486 therefor selectively mount the set 478 of the removable support legs 479, 480, 481, and 482 in the deployed positions thereof by removably attaching the removable support legs 479, 480, 481, and 482 to the subframe 459, as shown in FIG. 2, FIG. 3, and FIG. 7. For the sets 490 and 491 of the removable support legs 492 and 493, and 494 and 495 that are attachable to the clamp assemblies 409 and 410, respectively, the fasteners or bolts 509, 510, 511, and 512 therefor selectively mount the sets 490 and 491 of the removable support legs 492 and 493, and 494 and 495 in the deployed positions thereof by removably attaching the removable support legs 492 and 493, and 494 and 495 to the clamp assemblies 409 and 410, respectively, as shown in FIG. 2, FIG. 4, and FIG. 11.

The locking pins on the feet of the removable support legs of the horizontal support 408, as the locking pin 489 of the foot 488 shown in FIG. 8 and the locking pin 508 of the foot 507 shown in FIG. 9, selectively lock the lower ends of the removable support legs, when the removable support legs are in the deployed positions thereof, by removably fitting into sockets in the silo floor 92, as shown in FIG. 4 for the locking pins 513 and 514 and the sockets 515 and 516 for the set 490 of the removable support legs 492 and 493.

Figure 12:
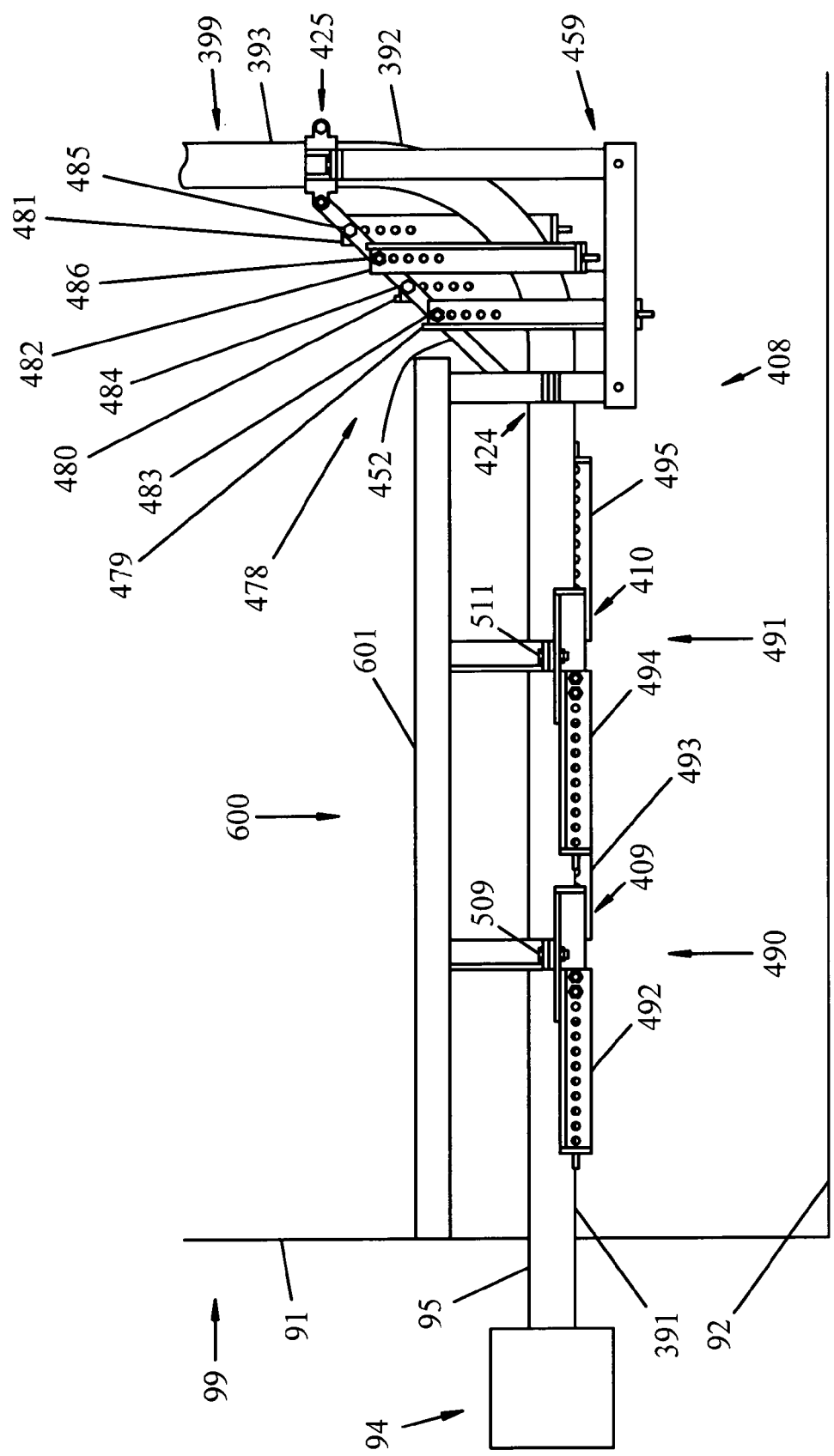
FIG. 12 is a side view of the embodiment of the present invention, as shown in FIG. 2, showing the support legs of the horizontal support in stored positions.

FIG. 12 shows the stored positions of the removable support legs of the horizontal support 408. For the set 478 of the removable support legs 479, 480, 481, and 482 that are attachable to the subframe 459, the fasteners or bolts 483, 484, 485, and 486 therefor are removed therefrom and the set 478 of the removable support legs 479, 480, 481, and 482 are removed from the deployed positions thereof. Subsequently, the removable support legs 479, 480, 482, and 481 may be placed adjacent the elbow brace 452 on opposite sides thereof and aligned with every other of the storing holes 455, 456, 457, and 458 thereof for clearance therebetween. When so placed, the fasteners or bolts 483, 484, 486, and 485 are then passed through the storing holes 455, 456, 457, and 458 of the elbow brace 452 and the aligned through holes of the removable support legs 479, 480, 482, and 481, respectively, selectively mounting the set 478 of the removable support legs 479, 480, 481, and 482 in the stored positions thereof by removably attaching the removable support legs 479, 480, 481, and 482 to the elbow brace 452, as shown in FIG. 12.

For the sets 490 and 491 of the removable support legs 492 and 493, and 494 and 495 that are attachable to the clamp assemblies 409 and 410, respectively, the fasteners or bolts 509, 510, 511, and 512 therefor are removed therefrom and the sets 490 and 491 of the removable support legs 492 and 493, and 494 and 495 are removed from the deployed positions thereof. Subsequently, the removable support legs 492 and 493, and 494 and 495 may be placed so that the storing hole 501 of each of the removable support legs 492 and 493, and 494 and 495 is aligned with and below the through hole of the side flange of the clamp assemblies 409 and 410, respectively. When so placed, the fasteners or bolts 509, 510, 511, and 512 are then passed through the through holes of the side flanges of the clamp assemblies 409 and 410 and the aligned storing holes 501 of the removable support legs 492 and 493, and 494 and 495, respectively, selectively mounting the sets 490 and 491 of the removable support legs 492 and 493, and 494 and 495 in the stored positions thereof by removably attaching the removable support legs 492 and 493, and 494 and 495 to the clamp assemblies 409 and 410, respectively, as shown in FIG. 12.

When in the stored positions thereof, the locking pins on the feet of the removable support legs of the horizontal support 408, as the locking pin 489 of the foot 488 shown in FIG. 8 and the locking pin 508 of the foot 507 shown in FIG. 9, are removed from the sockets therefor in the silo floor 92, as shown in FIG. 12.

Figure 13:
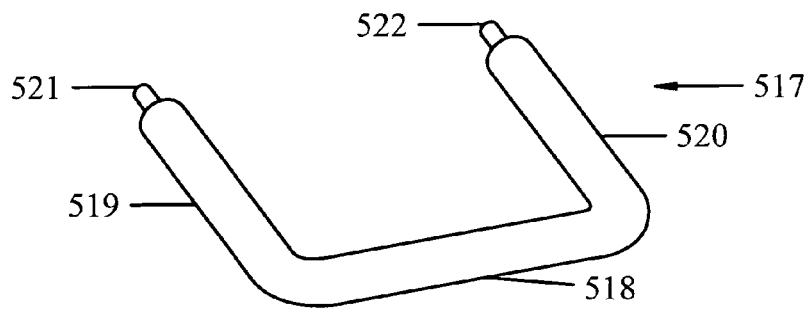
FIG. 13 is a perspective view of one embodiment of a bin sweep bumper of the present invention.
Figure 14:
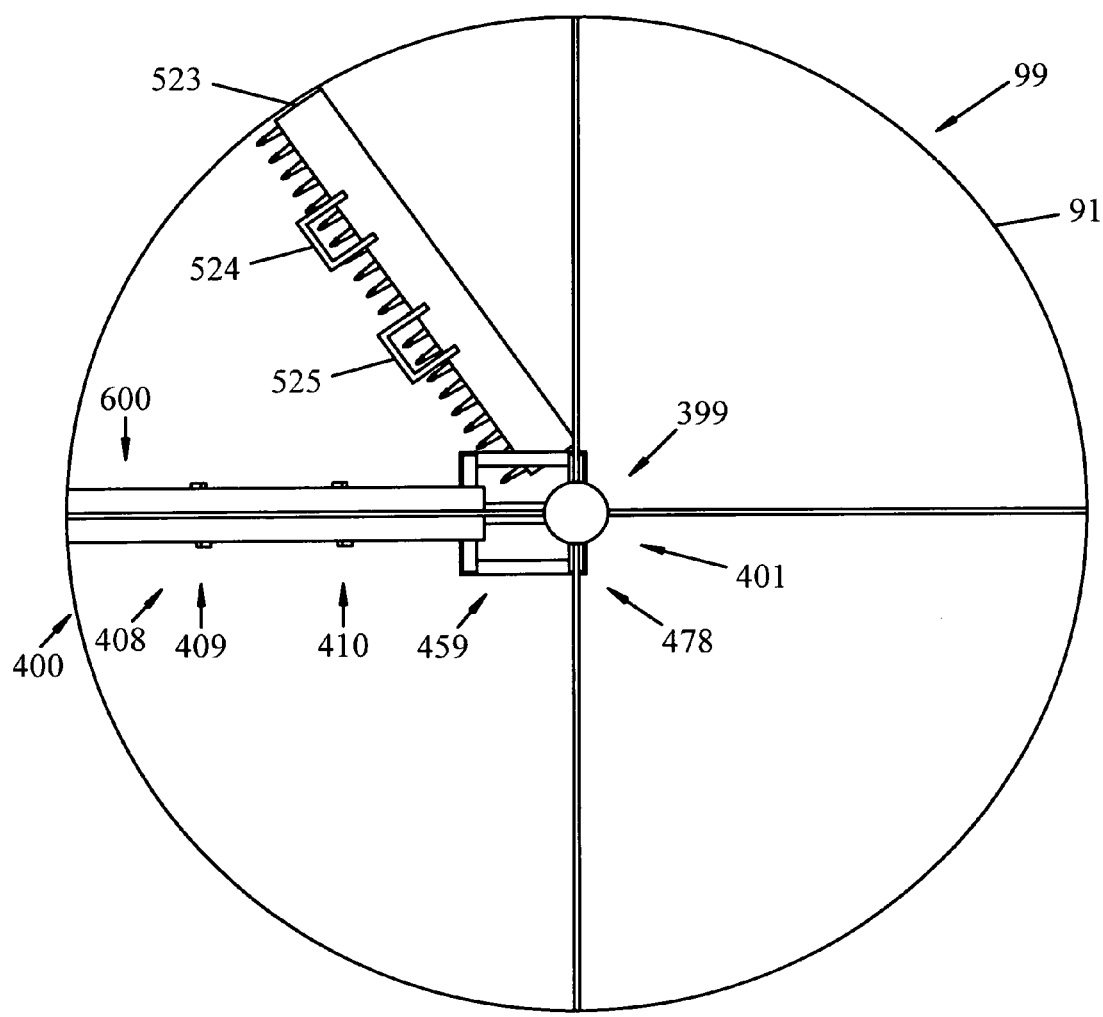
FIG. 14 is a schematic top view of one embodiment of the present invention, as shown in FIG. 1, within a storage silo having a bin sweep comprising bin sweep bumpers of the present invention.

Another embodiment of the present invention comprises a bin sweep bumper 517. As shown in FIG. 13, the bin sweep bumper 517 has a crossbeam 518 and a plurality of supports 519 and 520. The supports 519 and 520 each has a fastener or bolt 521 and 522, respectively, for attaching the bin sweep bumper 517 to a mechanical bin sweep 523. The mechanical bin sweep 523 is known in the art for mechanically sweeping the silo floor during the emptying of the silo. As shown in FIG. 14, the mechanical bin sweep 523 has a plurality of the bin sweep bumpers, and in particular bin sweep bumpers 524 and 525, generally identical with the bin sweep bumper 517 shown in FIG. 13, one for each set of the removable support legs that is attachable to the clamp assemblies, respectively, of the horizontal support 408. Each bin sweep bumper, when mount on and attached to the mechanical bin sweep 523, is aligned with one of the sets of the removable support legs of the horizontal support 408. Each bin sweep bumper, when so mounted and attached, projects beyond the mechanical bin sweep 523 in the direction of movement thereof. The bin sweep bumpers protect the mechanical bin sweep 523 from damage, when the mechanical bin sweep is moving during the emptying of the silo, due to impacting against the removable support legs of the horizontal support 408 when in the deployed positions thereof, by bumping first against the removable support legs of the horizontal support 408 before the mechanical bin sweep 523 itself can impact thereagainst.

Another embodiment of the present invention comprises a deflector 600, shown schematically in FIG. 1. The deflector 600 protects the horizontal section of the delivery system 399 from damage, as by crushing of the horizontal tube 391 thereof, that may occur during delivery of the material 93 into the silo 99 or settling of the material 93 within the silo 99 during storage thereof or during emptying of the material 93 from the silo 99.

The deflector 600 has at least one angled wall, and in particular, for the embodiment shown in FIG. 4 and also FIG. 2 and FIG. 3, a first angled wall 601 and a second angled wall 602. The walls 601 and 602 of the deflector 600 are flat metal, and are formed from a single piece of metal bent into an inverted V shape for ease and simplicity of construction. Alternatively, the walls of the deflector 600 may be formed from a plurality of pieces; and alternatively, the walls of the deflector 600 may be curved. A plurality of crossbeams, not shown, interconnect and reinforce the angled walls 601 and 602, and are attached thereto, as by welding. As shown in FIG. 4, the deflector 600 also has a flange that is mechanically fastened or bolted to the silo wall 91 for connecting and supporting the end of the deflector 600 adjacent to the silo wall 91 thereto.

The deflector 600 further includes a set of stanchions, attached to each of the clamp assemblies of the horizontal support 408 of the support system 400 that is mounted on the horizontal tube 391 of the horizontal section of the delivery system 399, for supporting the deflector 600 above generally the horizontal section of the delivery system 399; and in particular, for the embodiment shown in FIG. 2 and FIG. 11, sets 603, 604, and 605 of stanchions 606 and 607, 608 and 609, and 610 and 611 for the clamp assemblies 409, 410, and 424, respectively.

Each of the stanchions 606 and 607, 608 and 609, and 610 and 611 is metal and has an angle cross section of either unequal or, as shown, equal flange length, and may be angle iron for ease and simplicity of construction. Each of the stanchions 606 and 607, 608 and 609, and 610 and 611 has first and second flanges thereof oriented identically with the flanges of the removable support legs 492 and 493, and 494 and 495 and the stanchions 466 and 467, respectively, as shown in FIG. 11 and FIG. 10. The upper ends of the stanchions 606 and 607, 608 and 609, and 610 and 611 are cut at an angle to match the angle of the deflector walls 601 and 602, and are attached to the deflector walls 601 and 602, as by welding. Each of the stanchions 606 and 607, 608 and 609, and 610 and 611 has a foot 612 and 613, 614 and 615, and 616 and 617 attached to the lower end thereof, respectively, as by welding. Each of the feet 612 and 613, 614 and 615, and 616 and 617 may be a flat plate, as shown, for ease and simplicity of construction. Each of the feet 612 and 613, 614 and 615, and 616 and 617 has a through hole therein.

The through holes in the side flanges of the clamp assemblies 409, 410, and 424 align with the through holes in the feet 612 and 613, 614 and 615, and 616 and 617, respectively. As shown in FIG. 11, the fasteners or bolts 509, 510, 511, 512, 474, and 475 pass through the aligned through holes of the side flanges of the clamp assemblies 409, 410, and 424 and of the feet 612 and 613, 614 and 615, and 616 and 617, respectively, and are secured, as by nuts when bolts are used, attaching together the deflector 600 and the clamp assemblies 409, 410, and 424 of the horizontal support 408. When so attached, and when the removable support legs 492 and 493, and 494 and 495 are in the deployed positions thereof as shown in FIG. 2, the feet of the deflector 600 and the caps of the sets 490 and 491 of the removable support legs of the horizontal support 408 and of the inner set 464 of the stanchions of the subframe 459 sandwich the side flanges of the clamp assemblies 409, 410, and 424, respectively, as shown in FIG. 2, FIG. 3, and FIG. 4. When so attached, and when the removable support legs 492 and 493, and 494 and 495 are in the deployed positions thereof as shown in FIG. 2, the flanges of the stanchions 606 and 607, 608 and 609, and 610 and 611 of the deflector 600 align with the flanges of the removable support legs 492 and 493, and 494 and 495 and of the stanchions 466 and 467, respectively, as shown in FIG. 2, FIG. 10, and FIG. 11.

This description of the present invention is not intended to be limited to only metal materials. Plastic and rubber may also be substituted for any or all parts. The present invention also lends itself to colorful displays including confectionaries through the use of clear glass or clear plastic materials.

OPERATION

The delivery system 399 of the present invention operates to automatically sequentially fill the storage silo 99 with the material 93 when the material is transported to the silo 99 by a conveyor entraining the material within a flow of fluid. In the embodiment of the present invention shown in FIG. 1, that conveyor is the conventional pneumatic conveyor 94 that entrains the material within a flow of air for depositing the material 93 into the silo 99.

In one embodiment of the present invention that operates to automatically sequentially fill the storage silo 99, the pneumatic conveyor 94 operates at a relatively lower pressure. As the pneumatic conveyor 94 begins to convey the pneumatic material flow into the delivery system 399, filling of the storage silo 99 commences. The horizontal tube 391 of the delivery system 399 receives the pneumatic material flow from the pneumatic conveyor 94 and conveys the pneumatic material flow into the silo 99. The elbow 392 directs the pneumatic material flow from the horizontal tube 391 vertically into the vertical tube 393 that conveys the pneumatic material flow upwardly and downstream within the silo 99.

In this one embodiment of the present invention, the vertical tube 393 conveys the pneumatic material flow upwardly and downstream into the first material separator of the delivery system 399, which in the embodiment shown in FIG. 1 is the upstream separator 394. The pneumatic material flow expands from the inlet of the first material separator into the increased diametric volume of the forcing cone within the material separator. Insufficient air pressure results in a choking action within the material separator, specifically within the volume of the forcing cone of the material separator, separating the material 93 from the airflow. A flow of the separated material 93 is automatically deposited downwardly by gravity out of the material separator through the outlet thereof and into the silo 99, forming a mound of the separated material 93 having a material surface. The airflow is rapidly released upwardly through the outlet tube of the material separator and also downwardly through the outlet thereof. The released air is vented from the silo 99 through equalizing vents (not shown).

As the material separator, specifically the upstream separator 394, continues to separate the material 93 in accordance with the embodiment of the present invention, the flow of the separated material 93 raises the level of the material surface within the silo 99 to eventually meet with and block the outlet of the material separator. This blocking of this outlet automatically stops the flow, and the depositing, of the separated material 93 being deposited out of the material separator through the outlet thereof into the silo 99. The air pressure within the material separator rises to be sufficient for continued downstream conveying, automatically stopping the separating within the material separator. The pneumatic material flow reestablishes within the material separator.

The outlet tube, which in the embodiment shown in FIG. 1 is the vertical tube 395, of the material separator conveys the reestablished pneumatic material flow upwardly and downstream into the material separator of the delivery system 399 that is the next material separator that is downstream of the first material separator. In the embodiment shown in FIG. 1, that next material separator is the downstream separator 396. The downstream separator 396, which is that next material separator, then separates the material 93 from the airflow in the identical operation as that of the previous material separator (the upstream separator 394 in the embodiment shown in FIG. 1). The flow of the separated material 93 is deposited out of the downstream separator 396 onto the mound of the material 93 that had been deposited out of the upstream separator 394, the separated material 93 falling at most only as far as the previous material separator (the upstream separator 394 in the embodiment shown in FIG. 1), again raising the level of the material surface.

This operation of separating the material, flowing the material, depositing the material, then stopping the flowing and the depositing of the material by blocking the outlet, and then reestablishing the pneumatic material flow to convey upwardly the pneumatic material flow into the next material separator that is downstream is repeated for each of the material separators of the delivery system 399 in sequence from the bottom of the silo 99 to the top of the silo 99. The final separator in this sequence is the top separator 398, which operates similarly as all the other material separators operate. The cap of the top separator 398 redirects any flow through the second outlet of the top separator 398 downwardly and out of the top separator 398 into the silo 99.

In another embodiment of the present invention that operates to automatically sequentially fill the storage silo 99, the pneumatic conveyor 94 operates at a relatively higher pressure. Again, as the pneumatic conveyor 94 begins to convey pneumatic material flow, which is identical to the pneumatic material flow hereinbefore described except that the airflow from the blower of the pneumatic conveyor 94 is at the relatively higher pressure, into the delivery system 399, filling of the storage silo 99 commences. The horizontal tube 391 of the delivery system 399 receives the pneumatic material flow from the pneumatic conveyor 94 and conveys the pneumatic material flow into the silo 99. The elbow 392 directs the pneumatic material flow from the horizontal tube 391 vertically into the vertical tube 393 that conveys the pneumatic material flow upwardly and downstream within the silo 99.

In this other embodiment of the present invention, the vertical tube 393 conveys the pneumatic material flow upwardly and downstream into the first material separator of the delivery system 399, which in the embodiment shown in FIG. 1 is the upstream separator 394. The pneumatic material flow continues approximately unchanged from the inlet of the first material separator into the increased diametric volume of the forcing cone within the material separator to the through aperture thereof, expanding by only a small percentage. Most of the pneumatic material flow flows through the through aperture of the material separator upwardly to the distal side of the through aperture into the cylindrical volume of the outlet tube of the material separator. Insufficient air pressure results in a choking action within the material separator, specifically within the cylindrical volume of the outlet tube of the material separator, separating the material 93 from the airflow, automatically resulting in a gravimetric flow of the separated material 93 downwardly within the cylindrical volume of the outlet tube thereof, through the through aperture of the material separator to the proximal side of the through aperture, and downwardly within the volume of the forcing cone of the material separator. The flow of the separated material 93 is downwardly through an outer annular portion of the through aperture of the material separator simultaneously with the pneumatic material flow that is upwardly through an inner central portion of the through aperture of the material separator. The outer annular portion and the inner central portion are generally coaxial with this through aperture. The flow of the separated material 93 is automatically deposited downwardly by gravity out of the material separator through the outlet thereof and into the silo 99, forming a mound of the separated material 93 having a material surface. The airflow is rapidly released upwardly through the upper portion of the outlet tube of the material separator; some of the airflow is also released downwardly through the outlet thereof. The released air is vented from the silo 99 through equalizing vents (not shown).

As the material separator, specifically the upstream separator 394, continues to separate the material 93 in accordance with this other embodiment of the present invention, the flow of the separated material 93 raises the level of the material surface within the silo 99 to eventually meet with and block the outlet of the material separator. This blocking of this outlet automatically stops the flow, and the depositing, of the separated material 93 being deposited out of the material separator through the outlet thereof into the silo 99. The air pressure within the material separator rises to be sufficient for continued downstream conveying, automatically stopping the separating within the material separator. The pneumatic material flow reestablishes within the material separator.

The outlet tube, which in the embodiment shown in FIG. 1 is the vertical tube 395, of the material separator conveys the reestablished pneumatic material flow upwardly and downstream into the material separator of the delivery system 399 that is the next material separator that is downstream of the first material separator. In the embodiment shown in FIG. 1, that next material separator is the downstream separator 396. The downstream separator 396, which is that next material separator, then separates the material 93 from the airflow in the identical operation as that of the previous material separator (the upstream separator 394 in the embodiment shown in FIG. 1). The flow of the separated material 93 is deposited out of the downstream separator 396 onto the mound of the material 93 that had been deposited out of the upstream separator 394, the separated material 93 falling at most only as far as the previous material separator (the upstream separator 394 in the embodiment shown in FIG. 1), again raising the level of the material surface.

This operation of separating the material, flowing the material, depositing the material, then stopping the flowing and the depositing of the material by blocking the outlet, and then reestablishing the pneumatic material flow to convey upwardly the pneumatic material flow into the next material separator that is downstream is repeated for each of the material separators of the delivery system 399 in sequence from the bottom of the silo 99 to the top of the silo 99. The final separator in this sequence is the top separator 398, which operates in accordance with the embodiment of the present invention operating at the relatively lower pressure as hereinbefore described. The cap of the top separator redirects any flow through the second outlet of the top separator 398 downwardly and out of the top separator 398 into the silo 99.

Thus, for each separator, in each of the two embodiments of the present invention of operating thereof, the separator functions selectively in either one of two modes of operation. In one mode of operation, the separator separates the material from the airflow entraining the material and flows the separated material through the outlet thereof. In another mode of operation, the airflow entraining the material flows through the separator without separating the material therefrom and without flowing separated material through the outlet thereof. The selection between the two modes of operation is automatic, based on whether the surface of the mound of the deposited material does or does not block the outlet of the separator through which the separated material is deposited onto the mound. The selectively separating and selectively flowing requires no moving parts. Thus, for each separator, the separator selectively separates the material and selectively flows the separated material into the silo to sequentially fill the silo up to the height that the separator is located within the silo.

Further, the vertical support 401 of the embodiment shown in FIG. 1 has a plurality of the clamp assemblies to suspend and center the series of the tubes and the separators of the delivery system of the present invention. Simultaneously, the clamp assemblies, with the sets of braces thereof and the respective wall brackets, reinforce the silo wall against collapse of the silo by resisting the bowing outwards of the silo wall from the weight of the delivery system, the weight and any movement of the stored granular material within the silo, etc.; and, if the braces are rods, by also resisting the bowing inwards of the silo wall therefrom. The clamp assemblies are structurally attached to the silo wall through the sets of braces and the plurality of brackets to distribute pressure. The distribution of the wall brackets throughout the silo provides even weight transfer to the silo wall. The two equal half clamps of the clamps of the clamp assemblies simplify construction. The clamps of the clamp assemblies provide for even load transfer and stabilization through the application of opposing clamp brackets. Suspension of the delivery system of the present invention within the silo also provides an unobstructed floor area for mechanical or manual sweeping.

In yet another embodiment of the present invention, the material 93 stored within the storage silo 99, having a support system 400 supporting a delivery system 399 as shown schematically in FIG. 1, is removed therefrom when emptying the silo 99. In order to provide the silo floor 92 to be unobstructed by the support legs of the horizontal support 408 of the support system 400 for mechanical or manual sweeping of the silo floor 92, the removable support legs of the horizontal support 408 are removed from the deployed positions thereof, and may be placed in the stored positions thereof on the horizontal support 408.

Figure 15:
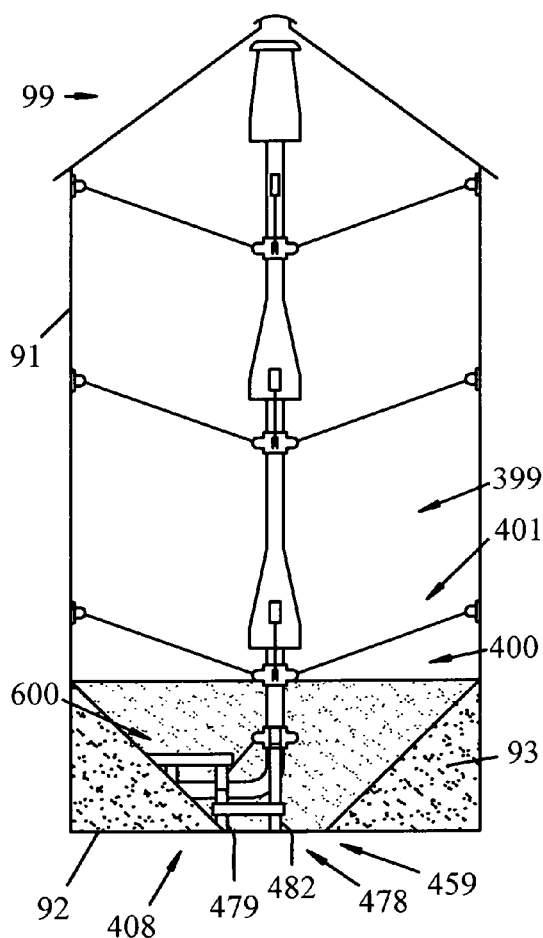
FIG. 15 is a schematic view of the embodiment of the present invention, as shown in FIG. 1, showing the extracting of the material from the silo until one of the support legs is accessible during the removal of the material from the silo.
Figure 16:
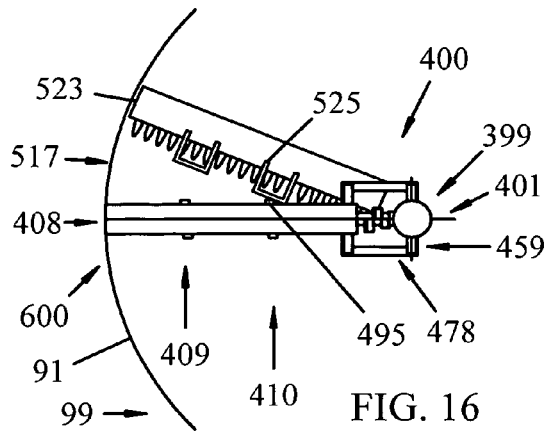
FIG. 16 is a schematic view, partly broken, of the embodiment of the present invention, as shown in FIG. 15, showing the removing and the placing of the support legs in stored positions that had been mounted in the deployed positions, and the operating of the bin sweep to continue extracting more of the material until one of the bumpers bumps into another support leg that is still mounted in the deployed position.

In this yet other embodiment of the present invention, the material 93 is extracted from the silo 99, as is known in the art, until the set 478 of the removable support legs 479, 480, 481, and 482 attached to the subframe 459 is accessible out of the material 93, as shown in FIG. 15. The interior of the silo 99 is accessed through a manual access port (not shown). The set 478 of the removable support legs 479, 480, 481, and 482 is removed from the deployed positions thereof, as shown in FIG. 16, by removing the fasteners or bolts 483, 484, 485, and 486 attaching the removable support legs 479, 480, 481, and 482 to the subframe 459 and subsequently moving the upper portions of the removable support legs 479, 480, 481, and 482 toward each other. This separates the removable support legs 479, 480, 481, and 482 from the subframe 459 and removes the locking pins thereof from the sockets therefor in the silo floor 92.

As shown in FIG. 16, the set 478 of the removable support legs 479, 480, 481, and 482 may be placed in the stored positions thereof by placing the removable support legs 479, 480, 481, and 482 adjacent the elbow brace 452 on opposite sides thereof. Each of the removable support legs 479, 480, 481, and 482 is rotated vertically ninety degrees so that one of the flanges thereof is adjacent the elbow brace and the other of the flanges thereof extends outwardly away therefrom, as shown in FIG. 12. Through holes of the removable support legs 479, 480, 482, and 481 are aligned with every other of the storing holes 455, 456, 457, and 458 of the elbow brace 452 for clearance between the removable support legs 479 and 482, and 480 and 481. When so placed, the fasteners or bolts 483, 484, 486, and 485 are then passed through the storing holes 455, 456, 457, and 458 of the elbow brace 452 and the aligned through holes of the removable support legs 479, 480, 482, and 481, respectively, and loosely secured, attaching the removable support legs 479, 480, 481, and 482 to the elbow brace 452 for removably storing the removable support legs 479, 480, 481, and 482 to the elbow brace 452 in the stored positions thereof. The removable support legs 479, 480, 482, and 481 hang downwardly from the elbow brace 452 at an angle from vertical against the elbow 392 of the delivery system 399.

Figure 18:
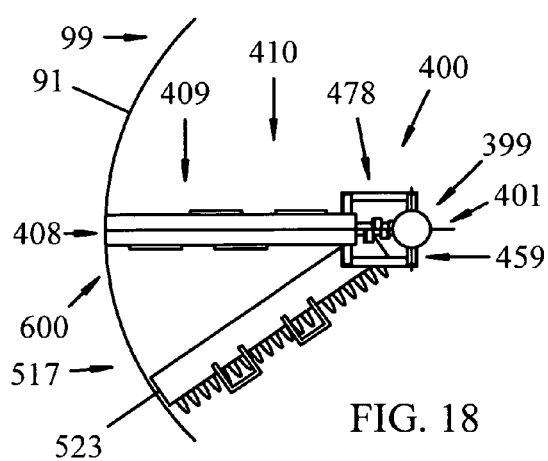
FIG. 18 is a schematic view, partly broken, of the embodiment of the present invention, as shown in FIG. 17, showing operating the bin sweep to continue extracting more material after all of the sequentially removing and placing of the support legs in the stored positions.

The silo 99 may be equipped with the bin sweep 523 having the plurality of the bin sweep bumpers 517. The bin sweep 523 may be advantageously previously positioned, when the silo 99 is approximately empty, in front of and near the removable support legs of the horizontal support 408, and in particular support legs 492 and 494 for a counterclockwise revolution of the bin sweep 523 similarly as shown in FIG. 18, such that the bin sweep 523 makes a maximum revolution before any of the bumpers 517 bumps into any of the removable support legs. (For a clockwise-revolving bin sweep so equipped with the bin sweep bumpers that is so previously positioned, that bin sweep would be in front of and near support legs 493 and 495.)

Figure 17:
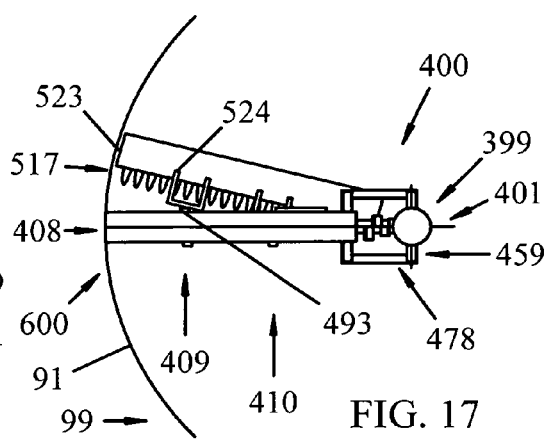
FIG. 17 is a schematic view, partly broken, of the embodiment of the present invention, as shown in FIG. 16, showing sequentially removing and placing another of the support legs in the stored position that had been mounted in the deployed position, and the continuing of the operating of the bin sweep until again one of the bumpers bumps into another support leg that is still mounted in the deployed position.

When the silo 99 is so equipped as shown in FIG. 14, subsequently the bin sweep 523 is operated to continue to extract more of the material 93 until one of the bumpers 517 bumps into the next removable support leg, that is next spaced radially outwardly from the removable support legs 479, 480, 481, and 482 attachable to the subframe 459, still mounted in the deployed position thereof, and in particular, as shown in FIG. 16, bumper 525 bumps into the removable support leg 495 attached to the clamp assembly 410. The bin sweep 523 is then stopped. The removable support leg 495 is removed from the deployed position thereof, as shown in FIG. 17, by removing the fastener or bolt 512 attaching the removable support leg 495 to the side flange of the clamp assembly 410 and subsequently moving the upper portion of the removable support leg 495 away from the clamp assembly 410. This separates the removable support leg 495 from the side flange of the clamp assembly 410 and removes the locking pin thereof from the socket therefor in the silo floor 92.

The removable support leg 495 may be placed in the stored position thereof, as shown in FIG. 17, by placing the storing hole 501 of the removable support leg 495 aligned with and below the through hole of the side flange of the clamp assembly 410. The removable support leg 495 is rotated ninety degrees from the vertical to the horizontal clockwise, so that the locking pin thereof is oriented inwardly of the silo 99, as shown in FIG. 12. When so placed, the fastener or bolt 512 is then passed through the through hole of the side flange of the clamp assembly 410 and the aligned storing hole 501 of the removable support leg 495 and secured, as by the nut when the bolt is used, attaching the removable support leg 495 to the clamp assembly 410 for removably storing the removable support leg 495 to the clamp assembly 410 in the stored position thereof.

The removable support legs attached to the clamp assemblies of the horizontal support 408 on the same side as that of the removable support leg 495, as removable support leg 493, likewise, when so rotated clockwise, orient so that the locking pins thereof are oriented inwardly of the silo 99. When the removable support legs attached to the clamp assemblies of the horizontal support 408 on the opposite side as that of the removable support leg 495, as the removable support legs 492 and 494, are so rotated clockwise, they orient so that the locking pins thereof are oriented outwardly of the silo 99, as shown in FIG. 12.

Subsequently the bin sweep 523 is again operated to continue to extract more of the material 93 until one of the bumpers 517 bumps into another of the removable support legs, that is so spaced radially outwardly, still mounted in the deployed position thereof, and in particular, as shown in FIG. 17, bumper 524 bumps into the removable support leg 493 attached to the clamp assembly 409. The bin sweep 523 is then stopped again. The removable support leg 493 is likewise removed from the deployed position thereof as was the removable support leg 495, as shown in FIG. 18, and likewise may be placed in the stored position thereof.

This sequentially operating the bin sweep 523 until one of the bumpers 517 bumps into another of the removable support legs still mounted in the deployed position thereof, stopping the bin sweep 523, and then removing that support leg which then may be placed in the stored position thereof continues until all of the removable support legs that are in the deployed positions thereof are so removed which then may be so placed stored, as shown in FIG. 18. Afterwards, the silo floor 92 is unobstructed by the removable support legs of the horizontal support 408 of the support system 400, and the bin sweep 523 can be operated without damage thereto, and/or manual sweeping can occur, to continue to extract more of the material 93 from the silo 99.

I claim:

1. A method of removing material from a storage, wherein the storage has an outlet of a conveyor for delivering the material to the storage, a system for supporting the outlet within the storage comprising a plurality of spaced, removable legs mounted in deployed positions, and a sweep comprising bumpers, wherein said method comprises:
  operating the sweep to extract the material until one of the bumpers bumps into one of the legs that is mounted in the deployed position thereof;
  stopping the sweep;
  removing the one leg from the deployed position thereof;
  continuing said operating and said stopping the sweep sequentially for each of the legs that is still mounted in the deployed position thereof, and removing respectively each of the legs that is still mounted in the deployed position thereof from the deployed position thereof, until all of the legs are removed from the deployed positions thereof; and operating the sweep to continue extracting more of the material.

2. The method of claim 1, further comprising placing each of the legs, after said removing thereof respectively, onto the supporting system in a stored position thereof.

3. The method of claim 1, further comprising previously positioning the sweep in front of the legs, when the legs are mounted in the deployed positions thereof, when the storage is approximately empty.

4. A method of removing material from a storage, wherein the storage has an outlet of a conveyor for delivering the material to the storage, a system for supporting the outlet within the storage comprising a plurality of spaced, removable legs mounted in deployed positions, and a sweep comprising bumpers, wherein said method comprises:
- extracting the material until at least one of the removable legs is accessible out of the material;
- removing the at least one leg from the deployed position thereof;
- placing the at least one leg onto the supporting system in a stored position thereof;
- operating the sweep to continue extracting more of the material until one of the bumpers bumps into another of the legs that is still mounted in the deployed position thereof;
- stopping the sweep;
- removing the other leg from the deployed position thereof;
- placing the other leg onto the supporting system in a stored position thereof;
- continuing said operating and said stopping the sweep sequentially for each of the legs that is still mounted in the deployed position thereof, and removing and placing, respectively, each of the legs that is still mounted in the deployed position thereof from the deployed position thereof onto the supporting system in a stored position thereof until all of the legs are in the stored positions thereof; and
- operating the sweep to continue extracting more of the material.

5. The method of claim 4, further comprising previously positioning the sweep in front of the legs, when the legs are mounted in the deployed positions thereof, when the storage is approximately empty.

6. A method of removing material from a storage, wherein the storage has an outlet of a conveyor for delivering the material to the storage, a system for supporting the outlet within the storage comprising a plurality of removable first legs mounted in deployed positions and a plurality of removable second legs mounted in deployed positions and spaced from the first legs, and a sweep comprising bumpers, wherein said method comprises:
- extracting the material until the removable first legs are accessible out of the material;
- removing the first legs from the deployed positions thereof;
- operating the sweep to continue extracting more of the material until one of the bumpers bumps into one of the removable second legs;
- stopping the sweep;
- removing the one leg from the deployed position thereof;
- continuing said operating and said stopping the sweep sequentially for each of the second legs that is still mounted in the deployed position thereof, and removing respectively each of the second legs that is still mounted in the deployed position thereof from the deployed position thereof, until all of the second legs are removed from the deployed positions thereof; and
- operating the sweep to continue extracting more of the material.

7. The method of claim 6, further comprising placing the first legs, after said removing thereof, onto the supporting system in a stored position thereof.

8. The method of claim 7, further comprising placing each of the second legs, after said removing thereof respectively, onto the supporting system in a stored position thereof.

* * * * *

UNITED STATES PATENT AND TRADEMARK OFFICE
CERTIFICATE OF CORRECTION

PATENT NO. : 9,776,814 B2
APPLICATION NO. : 15/731231
DATED : October 3, 2017
INVENTOR(S) : Phillip Douglas It is certified that error appears in the above-identified patent and that said Letters Patent is hereby corrected as shown below:

In the Specification

Column 8, Line 27, "has, aligned" should read --has aligned--.
Column 9, Line 27, "respectively; and" should read --respectively, and--.

Signed and Sealed this
Sixth Day of February, 2018

Joseph Matal
*Performing the Functions and Duties of the
Under Secretary of Commerce for Intellectual Property and
Director of the United States Patent and Trademark Office*